United States Patent
Reeves

(10) Patent No.: US 9,626,876 B2
(45) Date of Patent: Apr. 18, 2017

(54) INTEGRATING A NEW SUBSYSTEM WITH AN EXISTING COMPUTING ARCHITECTURE

(75) Inventor: Andrew John Reeves, West Sussex (GB)

(73) Assignee: Quadrant Systems Limited, West Sussex (GB)

( * ) Notice: Subject to any disclaimer, the term of this patent is extended or adjusted under 35 U.S.C. 154(b) by 573 days.

(21) Appl. No.: 12/807,109

(22) Filed: Aug. 27, 2010

(65) Prior Publication Data

US 2012/0036503 A1 Feb. 9, 2012

(30) Foreign Application Priority Data

Aug. 9, 2010 (GB) .................................. 1013362.7

(51) Int. Cl.
*G06Q 20/00* (2012.01)
*G09B 9/02* (2006.01)

(52) U.S. Cl.
CPC ........ *G09B 9/02* (2013.01); *G06F 2213/0038* (2013.01)

(58) Field of Classification Search
USPC ......................................................... 705/50
See application file for complete search history.

(56) References Cited

U.S. PATENT DOCUMENTS

| 5,481,712 | A | * | 1/1996 | Silver et al. .................. 717/109 |
| 6,996,589 | B1 | * | 2/2006 | Jayaram ............ G06F 17/30569 |
| 7,210,131 | B2 | * | 4/2007 | Schmidt et al. ............... 717/137 |
| 2003/0074386 | A1 | | 4/2003 | Schmidt et al. ................... 709/1 |
| 2007/0174819 | A1 | * | 7/2007 | Li et al. ......................... 717/136 |
| 2008/0270493 | A1 | * | 10/2008 | Schwaab ............... G06F 9/4451 |
| 2009/0164491 | A1 | * | 6/2009 | Cotichini et al. ............. 707/101 |

FOREIGN PATENT DOCUMENTS

| CN | 1879082 A | 12/2006 |
| WO | WO 97/25665 | 7/1997 |

* cited by examiner

*Primary Examiner* — John Hayes
*Assistant Examiner* — John M Winter
(74) *Attorney, Agent, or Firm* — Harrington & Smith

(57) ABSTRACT

Apparatus for integrating a new subsystem with an existing computing architecture, the apparatus includes a first physical interface for receiving data from the existing computing apparatus, a second physical interface for outputting data to the new subsystem; a processing means, and memory having stored thereon a first software module, a plurality of other software modules, and a first stored configuration, wherein the first software module, when executed by the processing means, is configured to read the first stored configuration and to cause the processing means to load a combination of ones of the plurality of other software modules, the combination of ones of the plurality of other software modules and a first subset of the combination of ones of the plurality of other software modules being defined by the first stored configuration, the first subset of the combination being operable, when executed by the processing means, to transform data received at the first physical interface into a form that is compatible with the new subsystem and to output the transformed data to the new subsystem, via the second physical interface.

15 Claims, 15 Drawing Sheets

INTEGRATING A NEW SUBSYSTEM WITH AN EXISTING COMPUTING ARCHITECTURE

FIELD OF THE INVENTION

The invention relates to apparatus, method and computer-readable instructions for integrating a new subsystem with an existing computing architecture.

BACKGROUND TO THE INVENTION

Vehicle simulators are commonly used for training people in how to operate the vehicle. One example of such vehicle simulators are flight simulators, which are a very important tool in the aviation industry and are used by commercial airlines, third party training centres and the military for training pilots.

Flight simulators are a complex assembly of numerous subsystems which comprise both hardware and software components. These subsystems can include a central host computer which executes most of the software components, a flight model, which is aircraft specific, cockpit instrumentation including aircraft avionics units, a flight control loading system and a motion platform which are the components responsible for providing the pilot with the feeling of being in a moving aircraft, a visual image generator and display system, a sound and aural cueing system and an instructor operating system (IOS).

Flight simulators are expensive to manufacture and can cost in the region of US$10-15 million. Typically their life expectancy is initially around 20 years, but this can be extended to approximately 30 years by updating software and/or hardware of the simulator. Updates can be required to bring the simulator into line with changes in regulatory requirement, new technologies and new and different aircraft configurations.

Traditionally, there are two different ways of performing software updates on a flight simulator. The first involves the installation and integration of new software on the host computer. The second is to use an external computer to provide the platform for the new functionality and to integrate the external computer with the host computer. Both of these are very complex processes which vary depending on both the existing system and the new software with which the system is to be updated. As such, the result is that the software and hardware required to update a simulator are specific to that simulator and cannot be used to update simulators of different types/specifications, even if the differences are relatively small. Furthermore, updates of these kinds require significant modification to the existing simulator software configuration in order to allow integration with the new software. This modification involves time and expense. Such updates are further complicated in that the configuration of the host software may not be well documented such that an engineer often has to spend time unravelling the simulator configuration. Moreover, as the configuration of host software is often unknown, engineers are faced with the significant problem of the fidelity of the simulator being degraded as a result of lost patches and the like.

A typical example of a flight simulator subsystem that is updated during the life of the simulator is the Visual Image Generator (VIG) subsystem. VIG subsystems are sometimes updated two or three times during the life of a simulator at intervals of 8 to 10 years.

FIG. 1 is a schematic of the computer apparatus of a flight simulator following an update via the first of the two above-described methods to include a new subsystem namely, in this example, a new VIG subsystem. The computer apparatus 10 comprises a host computer 100, an IOS 102 and a new VIG subsystem 104. The IOS 102 is connected to the host computer via an existing interface 106. The new VIG subsystem 104 is connected to the host system via a new interface 108. The host computer includes both the existing software 110 and new interface software 112. The new interface software 112 is introduced during the update and is configured to allow interaction between the new VIG subsystem 104 and the original software 110. The new interface software 112 is bespoke for each different simulator and depends on the configuration of the existing simulator system and the new VIG subsystem 104. The original host software 110 is heavily modified so as to allow it to communicate with the new interface software 112 and thus the new VIG subsystem 104. Also, the IOS 102 is updated to include additional controls in accordance with the new VIG subsystem 104. Because configurations of simulators from different original equipment manufacturers can vary, experience gained from time and effort spent by an engineer in upgrading one simulator is often not useful in upgrading another different simulator. This is highly inefficient.

The process involved in upgrading a vehicle simulator may include the following steps:
1) Decommissioning the existing VIG interface software;
2) Adding new hardware and driver software for the physical interface (not shown) with the new VIG subsystem to the host computer 100;
3) Physically connecting the new VIG subsystem 104 to the host computer 100;
4) Loading new VIG interface software 112 onto the host computer 100;
5) Performing extensive modification of the new VIG interface software 112 in order to integrate it with the existing simulation software 110;
6) Performing modifications to the existing simulation software 110 to enable integration with the new VIG software 112;
7) Performing modification of the IOS 102 for integration of the new features of the new VIG subsystem 104; and
8) Generating from the source files on the host computer 100 a new software release comprising a combination of the pre-update software and new update software Each of the above steps is both time-consuming and exposes the engineer to risks due to the unfamiliar nature of the simulator. One of the most prominent risks is that due to the determination of correct files required to build a new software release. The software delivered to host computer 100 under an upgrade such as that described above is provided with very limited or no maintenance capabilities.

It is an aim of the present invention to provide a system that can be used to update various different types of simulator without requiring significant modification of the existing software and/or hardware of the simulator. Another aim of the present invention is to provide an upgrade mechanism to reduce or eliminate the technical risks involved with modification of host software, to standardise the simulator update process to provide a substantially repeatable process, thereby reducing the amount of inefficiency involved with simulator updates.

SUMMARY OF THE INVENTION

According to a first aspect, apparatus for integrating a new subsystem with an existing computing architecture is provided, the apparatus comprising a first physical interface for receiving data from the existing computing apparatus, a second physical interface for outputting data to the new subsystem, a processing means, and memory having stored thereon a first software module, a plurality of other software modules, and a first stored configuration, wherein the first software module, when executed by the processing means, is configured to read the first stored configuration and to cause the processing means to load a combination of ones of the plurality of other software modules, the combination of ones of the plurality of other software modules and a first subset of the combination of ones of the plurality of other software modules being defined by the first stored configuration, the first subset of the combination being operable, when executed by the processing means, to transform data received at the first physical interface into a form that is compatible with the new subsystem and to output the transformed data to the new subsystem, via the second physical interface.

The processing means may comprise one or more processors and/or microprocessors. The processing means may also or alternatively comprise one or more application specific integrated circuits.

The memory means may comprise one or more memory modules, the one or more memory modules being, for example, any combination of RAM, ROM, flash memory, EEPROM etc.

A first one of the first subset of the combination of other software modules, when executed by the processing means, may be configured to be responsive to the arrival of data at the first physical interface to send a signal indicative of the arrival of the data at the first physical interface to the first software module, the first software module may be responsive to the receipt of the signal indicative of the arrival of the data at the first physical interface to send a first command signal successively to each of the other ones of the first subset of the combination of other software modules, and each of the other ones of the first subset of the combination of other software modules may be responsive to the receipt of the command signal to operate on data passed from a previous one of the first subset of the combination of other software modules.

Alternatively, the other ones of the first subset of the combination of other software modules may be arranged in parallel, or in a hybrid serial/parallel arrangement.

The second physical interface may configured to receive data from the new subsystem, wherein the first software module, when executed by the processing means, is operable to cause the processing means to execute a second subset of the combination of ones of the plurality of other software modules, the second subset of the combination of ones of the plurality of other software modules being defined by the first stored configuration and being operable, when executed by the processing means, to transform data received at the second physical interface into a form that is compatible with the existing computing apparatus and to provide the transformed data to the existing computing apparatus via the first physical interface. Here, a first one of the second subset of the combination of other software modules, when executed by the processing means, may be configured to be responsive to the arrival of data at the second physical interface to send a signal indicative of the arrival of the data at the second physical interface to the first software module, the first software module may be responsive to the receipt of the signal indicative of the arrival of the data at the second physical interface to send second command signals successively to each of the other ones of the second subset of the combination of other software modules, and each of the other ones of the second subset of the combination of other software modules may be responsive to the receipt of the command signal to operate on data output from a previous one of the second subset of the combination of other software modules.

The second subset may be wholly comprised of modules of the first subset, i.e. the first subset may comprise the whole of the combination of ones of the plurality of other software modules. Alternatively, the first subset may include modules not in the second subset and vice versa.

The other software modules may be configured to output data in one of a plurality of predefined data structures. The predefined data structures may be stored in shared memory.

The first stored configuration defines which of the other software modules are configured to be responsive to the arrival of data at the first physical interface to send the signal indicative of the arrival of the data at the first physical interface to the first software module.

The first software module may be configured to cause one or more of the loaded other software modules to read a respective other stored configuration, the identity of the respective other stored configurations being defined by the first stored configuration. The first software module may be configured to cause each of the loaded other software modules to read a respective other stored configuration, the identity of the respective other stored configurations being defined by the first stored configuration. In either case, the each of the other stored configurations may define settings for a respective one of the loaded other software modules. Each of the other stored configurations may comprise an initialisation file.

The first stored configuration may comprise an initialisation file.

According to a second aspect, a method of operating apparatus for integrating a new subsystem with an existing computing architecture, the method comprising reading a first stored configuration, loading a combination of ones of a plurality of software modules, the combination of ones of the plurality of software modules and a first subset of the combination of ones of the plurality of other software modules being defined by the first stored configuration, and receiving data from the existing computer architecture at a first physical interface, the first subset of the combination of ones of the plurality of software modules transforming the data received at a first physical interface into a form that is compatible with the new subsystem and providing the transformed data to the new subsystem via a second physical interface of the apparatus.

According to a third aspect, computer-readable instructions for computing apparatus, optionally stored on a non-transitory computer medium, for integrating a new subsystem with an existing computing architecture are provided, the computer-readable instructions comprising a first software module and a plurality of other software modules, the first software module, when executed by the computing apparatus, causing the computing apparatus to read a first stored configuration and to load a combination of ones of a plurality of software modules, the combination of ones of the plurality of software modules and a first subset of the combination of ones of the plurality of other software modules being defined by the first stored configuration, the first subset of the combination of ones of the plurality of software modules, when executed by the computing apparatus, causing the computing apparatus to transform data received at a first physical interface from the existing computing architecture into a form that is compatible with the new subsystem, and to provide the transformed data to the new subsystem via a second physical interface.

DETAILED DESCRIPTION OF THE EMBODIMENTS

Figure 2:
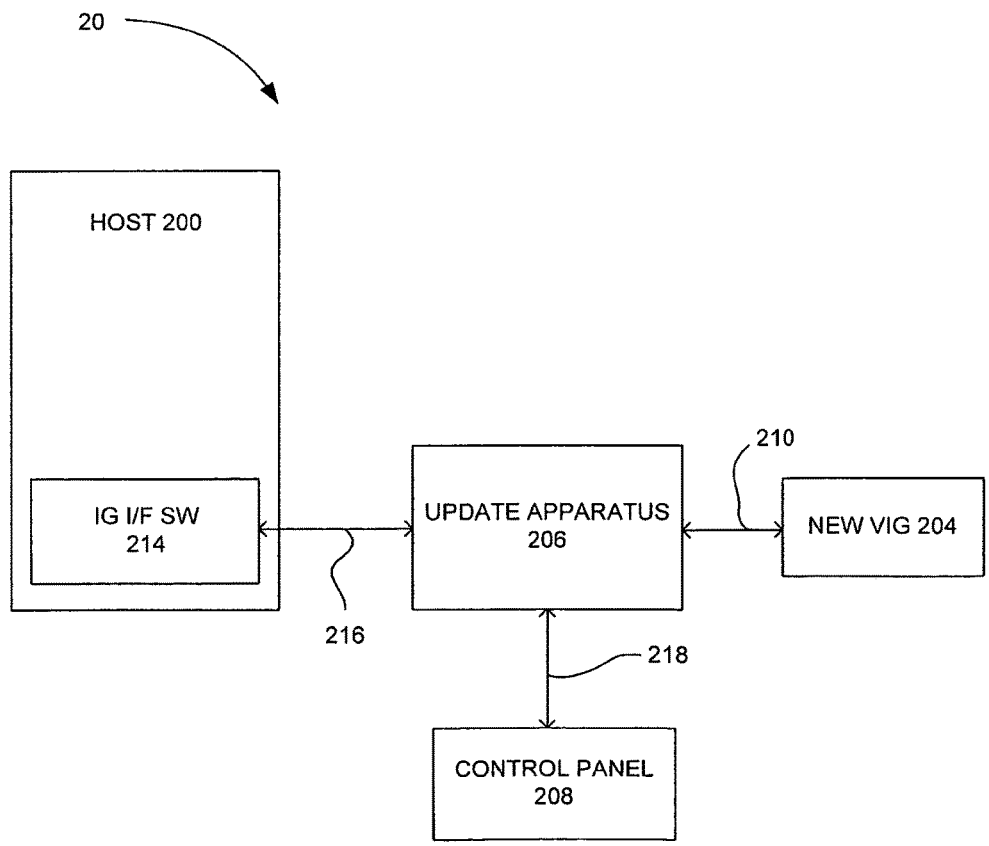
FIG. 2 is a simplified schematic of a flight simulator system having a new subsystem and incorporating update apparatus according to the invention.

FIG. 2 is a simplified schematic of the computing apparatus 20 of a vehicle simulator system having been updated with a new subsystem and incorporating update apparatus 206 according to aspects of the invention. In this example, the vehicle simulator system is flight simulator and the new subsystem is a new VIG subsystem 204. It will be appreciated that the invention applies also to other types of vehicle simulator system and to different types of new subsystems for integration with the simulator system. It will also be appreciate that the update apparatus may be operable to integrate more than one new subsystem with an existing simulator system.

The computing apparatus 20 comprises a host computer 200, an IOS 202 and the new VIG subsystem 204. The computing apparatus 20 also comprises update apparatus 206 according to the invention, and a dedicated control panel 208. The dedicated control panel is an optional user interface panel comprised of software running on computing hardware. The new VIG subsystem 204 is connected with the update apparatus 206 via a first interface 210. The update apparatus 206 is connected with a VIG interface module 214 of the host computer 200 via a second interface 216. As such, the new VIG subsystem 204 is connected with the host computer via the update apparatus 206. In other words, the update apparatus acts as an intermediary between the new VIG subsystem 204 and the host computer 200. The dedicated control panel 208 is connected to the update apparatus 206 via a third interface 218. The update apparatus may also comprise a maintenance interface (see FIG. 3) by which computing apparatus such as a laptop computer (for example, belonging to a maintenance engineer) can be connected to the update apparatus so as to allow maintenance of the update apparatus to be carried out. In embodiments in which the update apparatus is used to integrate more than one new subsystem with the host computer 200, the update apparatus comprises additional interfaces (not shown), one for each new subsystem.

The system 20 may also comprise an IOS (not shown) connected to the host computer.

Figure 1:
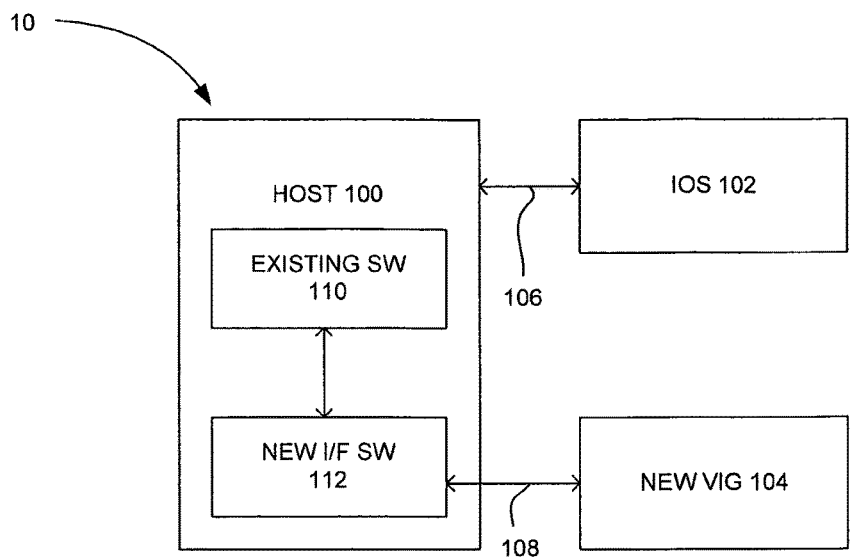
FIG. 1 is a simplified schematic of the computing apparatus of a flight simulator system updated with a new visual interface generator subsystem according to the prior art.

The presence of the update apparatus 206 between the new VIG subsystem 204 and the host computer 200 means that the VIG interface module 214 of the host computer 200 is provided with only a relatively minor software update. This is, in part, because the update apparatus 206 provides the platform for requisite new software that would otherwise have to be integrated into the host computer 200, as in traditional updates such as that described with reference to FIG. 1. The minor software update is substantially less complex than that required in the update method described with reference to FIG. 1. This is described in more detail later.

The dedicated control panel 208 provides a means for an instructor to control aspects of the new subsystem 204. Thus, the IOS 202 does not require an update in order to operate with the new subsystem 204. In other words the IOS 204 is unmodified. It will, therefore, be understood that the updating of computer apparatus 20 of a flight simulator using the update apparatus 206 of the invention requires no substantial modification of the existing hardware or software. Furthermore, as will described hereafter, the update apparatus is at least partially generic in that various aspects of the update apparatus can be used with many different types of simulator and subsystem.

Physically, the update apparatus 206 may be a "black box" embedded solution. Optionally, a front panel of the update apparatus may comprise an LCD interface for providing high level diagnostic and status information, ports, for example Ethernet ports, for the external interfaces, and a port for a maintenance interface (see below). Internally the update apparatus may comprise a combination of processors and/or microprocessors and memory media such as ROM and/or RAM.

Figure 3:
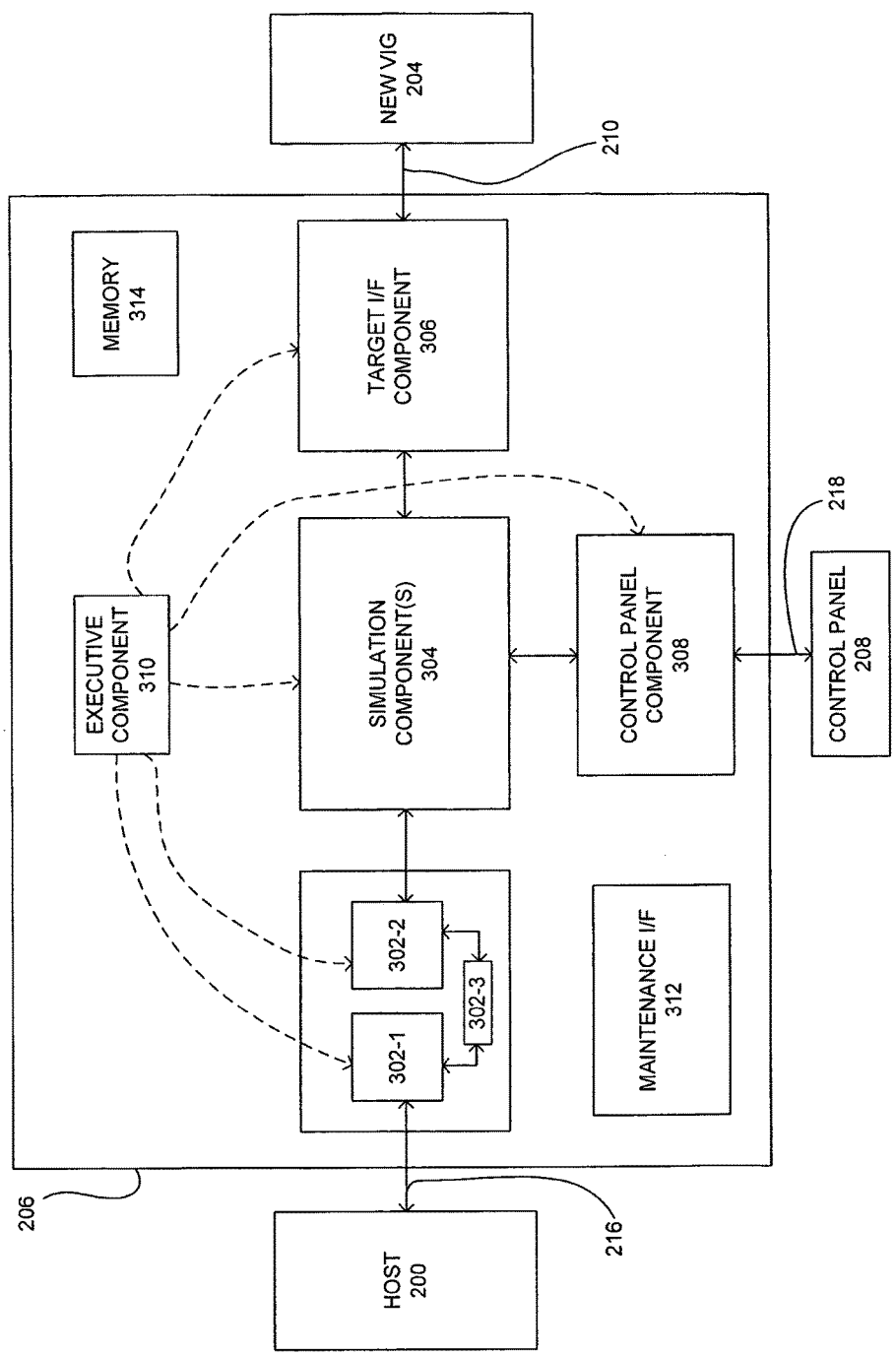
FIG. 3 is a simplified schematic of the update apparatus according to the invention.

FIG. 3 is a schematic depiction of the update apparatus 206 according to the invention. The update apparatus 206 comprises a host interface component 302 which comprises first and second sub-components 302-1, 302-2. The first sub-component 302-1 is a physical host interface component at which data is received from the host computer 200. The second sub-component 302-2 is a data formatting and manipulating component. The data formatting and manipulating component 302-2 is operable to format the data received at the physical host interface 302-1 component into a pre-defined data structure for use by simulation components. The update apparatus 206 also comprises one or more simulation components 304 which provide simulation control for subsystems being added to the simulator. The update apparatus 206 also comprises a target interface component 306, which provides the communication interface between the update apparatus 206 and the new VIG subsystem 204. The update apparatus 206 optionally also comprises a control panel component 308, which provides an instructor simulation interface to the new VIG subsystem 204. Each of these components is configurable depending on the simulator and the new subsystem. Each of the components 302, 304, 306, 308, 310, 312 of the update apparatus 206 is a software component selected from a dynamically loadable library and executed by one or more processors of the update apparatus 206.

The update apparatus 206 also comprises an executive component 310, which is an executive framework that controls the loading of configurable components and their execution within the update apparatus 206. The update apparatus 206 also comprises a maintenance interface component 312, which provides a web page maintenance interface and enables modifications to the configuration of the update apparatus 206 and real time evaluation of data held within memory 314. The executive component 310 and the maintenance interface component 312 are common to all instances of the update apparatus 206, regardless of the simulator and new subsystem 204.

The configurable components 302, 304, 306, 308 of the update apparatus 206 (i.e. the host interface component 302, the simulation components 304, the target interface component 306, and the control panel component 308) may be extensively configured. For a given configuration of simulator and new subsystem 204, the configurable components 302, 304, 306, 308 are via stored configurations, which may be stored in the memory 314. In this example, the stored configurations are initialisation files. However, it will be understood that the stored configurations may alternatively comprise registry keys, licence settings, database entries or any other means by which to store and subsequently read a configuration. The configurable components 302, 304, 306, 308 are dynamically loaded at initialisation by the executive component 310. The configurable components 302, 304, 306, 308 are dynamically loaded based on an initialisation file, which is read by the executive component 310 at initialisation and which identifies which configurable components are to be loaded. The configurable components 302, 304, 306, 308 are managed at runtime by the executive component 310. This enables the update apparatus 206 to contain a suite of components that provide a range of new functionality that may be deployed to a simulator of any type or age. The update apparatus 206 is able to communicate with multiple data sources and can provide numerous combinations of configurable components 302, 304, 306, 308.

The executive component 310 is operable to perform at least the following functions:
1. Read the initialisation file, which defines the components 302, 304, 306, 308 for integrating the new subsystem 204 with a given host computer 200;
2. Dynamically load the required configurable components 302, 304, 306, 308 from the dynamically loadable library based on the initialisation file;
3. Configure and perform the scheduling of the execution of the configurable components using a multithreaded software triggering mechanism;
4. Monitor the status of the components of the update apparatus 206 and return reports of any detected errors to the maintenance interface component 312; and
5. Provide automatic recovery from an error state, if required.

The ability of the update apparatus 206 to operate with any different type of simulator and subsystem is provided at least partially by the dynamically loadable and configurable components 302, 304, 306, 308. These components are stored as individual shared objects within a library. There is no practical limit to the number of configurable components 302, 304, 306, 308 that may be stored in the library Each of the configurable components 302, 304, 306, 308 can provide two core functional paths depending on requirements of the new subsystem 204. Typically, a first path is used to manipulate data originating from the existing host computer 200 ready for use by another of the configurable components or for transmission to the new subsystem 204. The second path is typically used to manipulate data originating from the new VIG subsystem 204 for use by another of the configurable components or for transmission back to the host computer 200.

Each configurable component 302, 304, 306, 308 is based on a standard template containing placeholders for four critical functions that are required to interface with the executive component 310. These functions are:
1. init( . . . ), which is invoked on initialisation to provide any bespoke initialisation of the configurable component;
2. run1( . . . ), which is invoked by the executive component to execute one of the two functional paths, typically the first path (i.e. the path in the direction from the host computer 200 to the new VIG subsystem 204);
3. run2( . . . ), which is invoked by the executive component to execute the other of the two functional paths, typically the second path (i.e. the path from the new VIG 204 subsystem to the host computer 200); and
4. term( . . . ), which is invoked by the executive component following an exit command from a user or following detection of a serious error so as to allow any appropriate error correction operations to be performed in respect of the configurable component.

Data which is passed between the configurable components 302, 304, 306, 308 is packaged into one of plurality of different data structures. The data structures provide a specific packet of information that is required by the component to which the data is being passed. Each configurable component has a subset of the available data structures. The data structures exist in a memory, such as memory 314 that is shared between all of the configurable components 302, 304, 306, 308. The data structures may be created by the configurable components 302, 304, 306, 308 as they are required. Alternatively, each of the data structures may be loaded dynamically by the executive component 310 at initialisation.

The use of pre-defined data structures to pass data allows engineers to stipulate the contents of the host interface buffer 302-3 with requiring the generation of bespoke software. The data structures applicable to a given host interface are defined in the initialisation file of the data formatting and manipulating component 302-1.

Additional configurable components can be added to the library stored on the update apparatus 204 without affecting previously released configurable components. This may occur when new subsystems are produced, or updated, and require integration with existing simulators.

Figure 4:
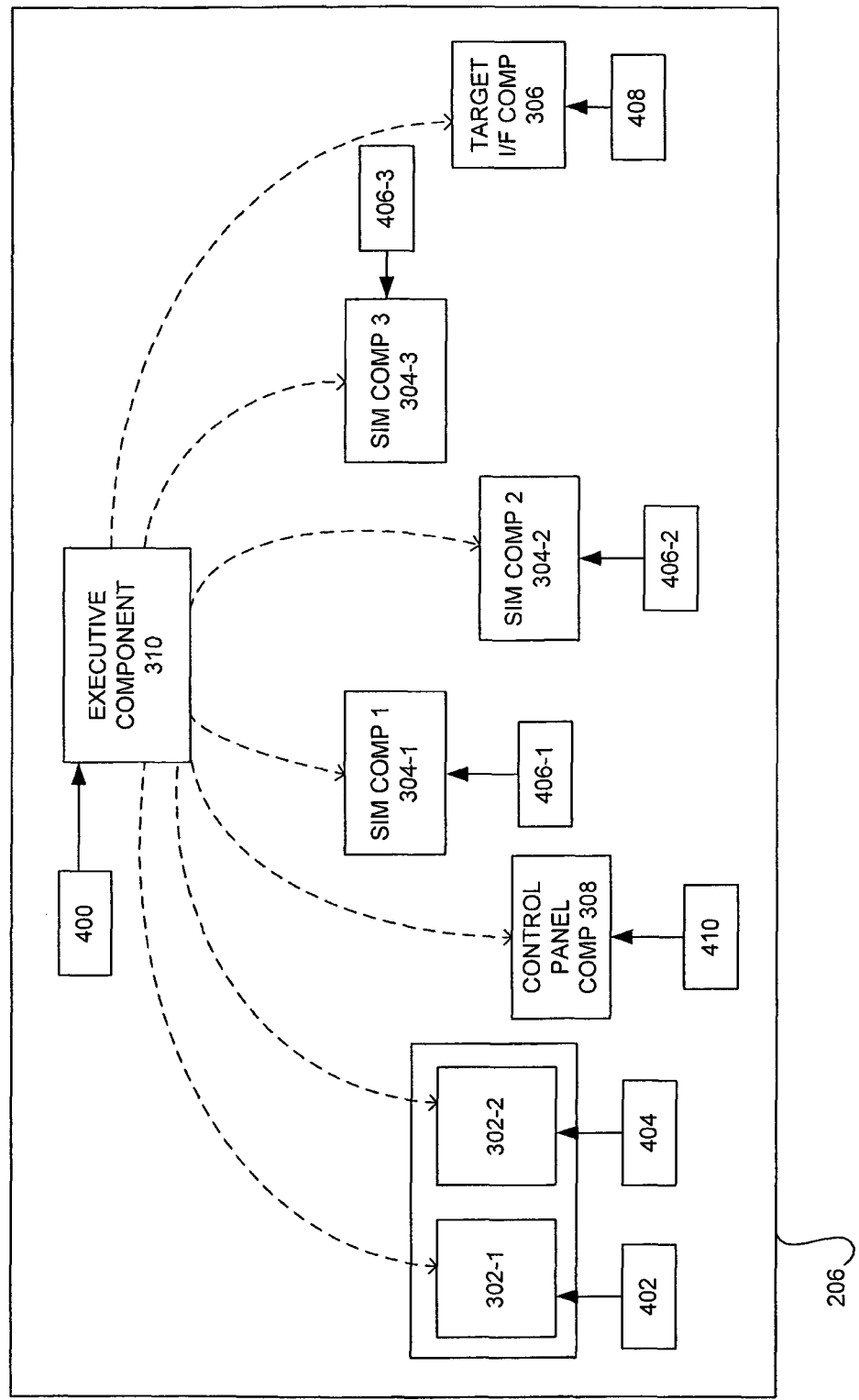
FIG. 4 is a simplified schematic showing initialisation of the update apparatus of FIG. 3.

Although the memory 314 is shown in FIG. 4 as a single unit, it is appreciated that the memory 314 may comprise a plurality of different memory modules. The memory modules may be configured depending on the type of data being stored thereon. For example, the library of configurable components may be stored on a read-only memory module as these components are only required to be read, and not written, by the update apparatus. The shared memory for storing the data structures however may comprise one or more read-write memory modules.

FIG. 4 illustrates the initialisation of the update apparatus 206 according to an exemplary embodiment of the invention.

At start-up of the update apparatus 206, the executive component 310 reads its executive initialisation file 400 and holds pertinent information therefrom within memory 314. The initialisation file identifies the configurable components 302, 304, 306, 308 which are to be loaded. The executive component 310 thus causes the configurable components 302, 304, 306, 308 identified by the initialisation file to be loaded.

In the example of FIG. 4, the executive component 310 loads the host interface component 302, the one or more simulation components 304, the target interface component 306 and the control panel component 308. The executive component 310 calls an initialisation function, init( . . . ), for each of the configurable components and causes an appropriate initialisation file 402, 404, 406, 408, 410 (as read from the executive component's executive initialisation file 400) to be passed to each of the components 302, 304, 306, 308. In this way, each of the configurable components 302, 304, 306, 308 of the update apparatus 206 is fully initialised and ready to run in response to further commands from the executive component 310.

The initialisation file 400 which is passed to the host interface component 302-1 may, for example, provide IP address and port information. The initialisation file may also indicate to the host interface component the location to which incoming data should be written. The initialisation file 402 that is passed to the data formatting and manipulating component 302-2 may, for example, indicate to the data formatting and manipulating component 302-2 the format or structure in which data arrives. The initialisation file 408 that is passed to the target interface component 306 may indicate the identity of data structure into which data received at the target interface component should be written and also a location of a buffer associated with 306 target interface component 306 at which the data should be stored. It will thus be understood that the initialisation files 402, 404, 406, 408, 410 which are passed to the configurable components 302, 304, 306, 308, provide information or settings which are relevant to the operation of that particular configurable component. The use of initialisation files with the configurable components 302, 304, 306, 308 provide configurability and flexibility and thus allow the apparatus to be used for integrating new subsystems in to many different types of simulator system. Not all configurable components require initialisation files and, in such cases, the executive initialisation file 400 does not define an initialisation file for that particular component.

The following is an example of the executive initialisation file 400 (hereafter called NUQ.ini):

| NUQ.ini |
|---|
| [TRIGGERS] |
| Trig1=HOST_IF, run1, DataManipulator, SC1, SC3, SC2, TARG_IF |
| Trig2=TARG_IF, run2, SC1, DataManipulator, HOST_IF |
| [HOST_IF] |
| load = ./RAW.so |
| iniFile = HostIf.ini |
| [DataManipulator] |
| load=DM.so |
| iniFile=DM.ini |
| [SC1] |
| load = ./cSimCompOne.so |
| iniFile=SC1.ini |
| [SC3] |
| load = ./cSimCompThree.so |
| iniFile = SC3.ini |
| [SC2] |
| load = ./cSimCompTwo.so |
| iniFile = SC2.ini |
| [TARG_IF] |
| load = ./Targ_IF.so |
| iniFile = TARGIF.ini |

HOST_IF relates to the first sub-component 302-1 (i.e. the physical host interface component) of the host interface component 302. DataManipulator relates to the second sub-component 302-1 of the host interface component 302 SC1 relates to the first simulation component 304-1, SC2 relates to the second simulation component 304-2, and SC3 relates to the third simulation component 304-3. TARG_IF relates to the target interface component 306. As such, a section of the executive initialisation file 400 is defined for each configurable component 302, 304, 306, 308 that is to be loaded and configured.

The section relating to each component defines an object, such as a Linux Shared Object, which is to be loaded and also identifies the initialisation file that is to be read by that component upon loading. For example, the section of NUQ.ini that relates to the physical host interface component 302-1 (see the [HOST_IF] section) defines that the object to be loaded is named "RAW.so" and that, upon loading, the component should read the initialisation file named "HostIf.ini".

The executive initialisation file 400, "NUQ.ini", also defines how the configurable components 302, 304, 306, 308 should operate when transferring data from the host computer 200 to the new subsystem 204. This is defined in the "TRIGGERS" section of "NUQ.ini".

Each of the triggers in the "TRIGGERS" section defines 3 parameters. The first parameter in each of the triggers (i.e. "Trig1" and "Trig2") defines the configurable component that notifies the executive component 310 when data has arrived at the interface of that component. For example, in "Trig1", the first parameter is "HOST_IF" which identifies the physical host interface component 302-1. Thus, "Trig1" defines that, when data arrives at the physical host interface component 302-1, the physical host interface component 302-notifies the executive component 310.

The second parameter defines the function group that is executed at one or more the configurable components following receipt by the executive component 310 of the notification. In "Trig1", the function group is "run1( . . . )".

The third, fourth and subsequent parameters define in which configurable components the function group, as defined by the second parameter, should be executed and the sequential order in which they should be executed. Thus, "Trig1" defines that, in response to receiving notification from the physical host interface component 302-1 that data has arrived, the executive component should cause the function group "run1( . . . )" to be executed sequentially in each of the data formatting and manipulating component 302-2, the first simulation component 304-1, the third simulation component 304-2, the second simulation component 304-2, the target interface component 306 and then finally in the control panel component 308.

The target interface component 306 (TARG_IF in Trig1) is the component via which data is output from update apparatus 206. As can be seen from Trig1, this is not the last component in which the function "run1( . . . )" is executed. Thus, it is clear that further configurable components can be run after data is output from the apparatus 206. As such, non-critical software may be executed after critical data has been output from the apparatus 206.

Although not shown in the exemplary initialisation file, the file may also define a background task component. Such a component may be controlled and triggered by the executive component 310. The component may be triggered using a trigger, which, instead of the arrival of data, is based an internal, low priority timer. Thus, when the timer expires, a trigger is sent to the executive component, which sends a control signal to the background component which causes the background component to be executed. The background component may perform basic housekeeping tasks, and/or simulation functionality that does not need to be run in a rigid deterministic sequence starting from the arrival of data packets through an external interface component. Examples of such background tasks and non-sequential software functionalities include error and performance checking and the reporting of software commands, such as start or stop commands.

As previously described, in some embodiments the stored configurations may be, for example, database entries instead of initialisation files. These embodiments operate in substantially the same way as the above-described embodiments. However, the configurations for the executive component 310 and other configurable components 302, 304, 306, 308 are stored in a relational database. Each stored configuration relating to a separate component may be stored in a separate database entry. The database entries may contain the same information as described above with reference to the initialisation files. The configurations are accessed and returned by a server application running on the update apparatus 206 in response to queries from the executive component 310 and/or other configurable components 302, 304, 306, 308. In these embodiments, at start-up, the executive component 310 posts a query to the server application requesting its associated stored configuration 400 to be returned. Following receipt of the stored configuration, the executive component 310 uses the information within the stored configuration to load the required configurable components. Subsequent to loading the configurable components, the executive component 310 calls a function which causes each of the configurable components 302, 304, 306, 308, where appropriate, to post a query to the server application requesting return of their associated stored configuration 402, 404, 406, 408, 410. In response to receiving a query from a component, the server application sources the stored configuration identified in the query from the database and returns it to the requesting component. Upon receipt from the server of the stored configuration, the component is configured in accordance with the information stored therein.

Although not described in detail herein, the skilled person will understand how the stored configurations are retrieved in embodiments in which different types of stored configuration, such as registry keys or licence settings, are used.

Figure 5:
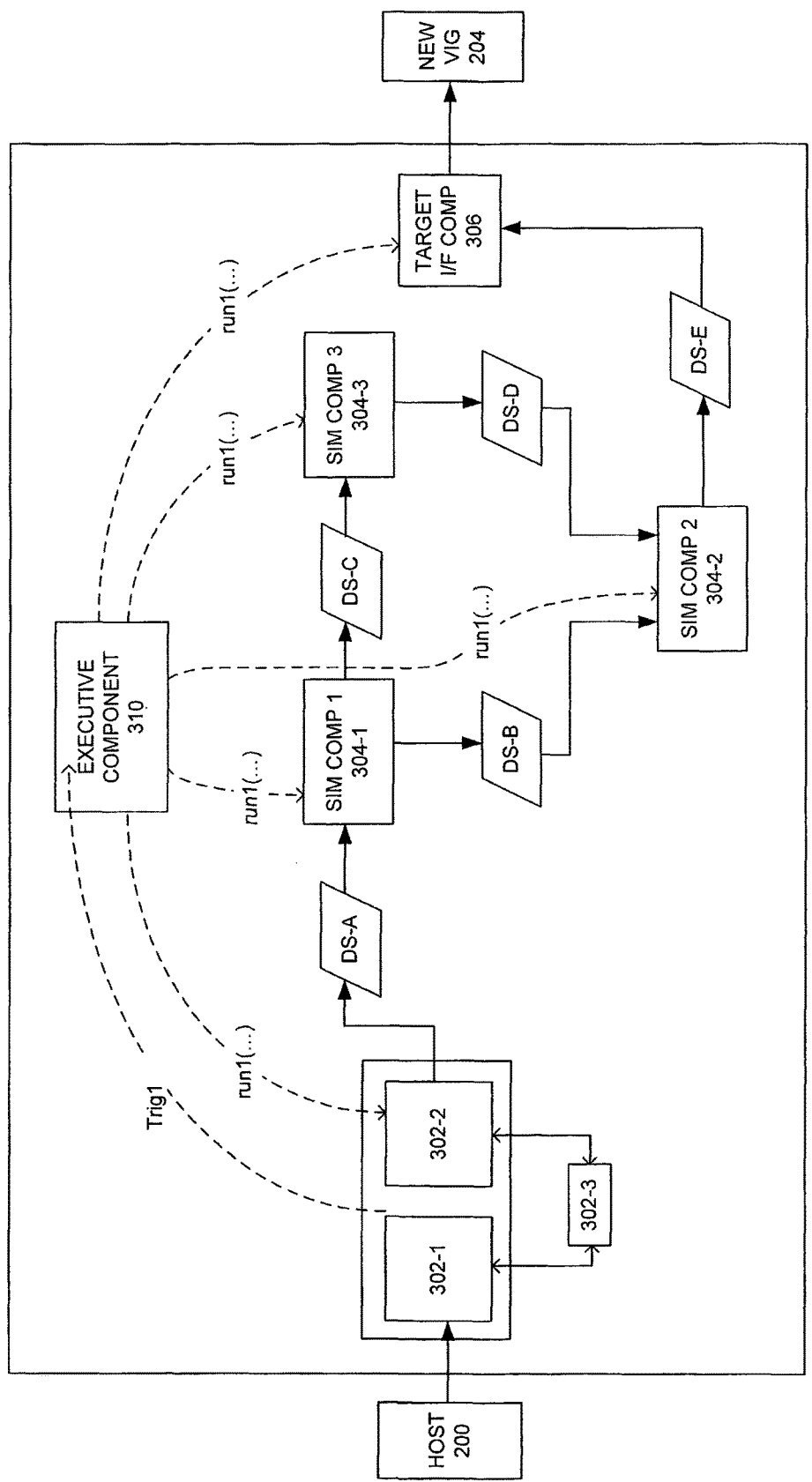
FIG. 5 is a simplified schematic showing an exemplary flow of data in a first direction through the apparatus of FIG. 3.

FIG. 5 illustrates the transfer of data from the host computer 200 to the new VIG subsystem 204 through the update apparatus 206. Those components of the update apparatus 206 which are not involved in this exemplary data transfer are not shown in FIG. 5. In the example depicted in FIG. 5, the update apparatus 206 comprises three simulation components 304-1, 304-2, 304-3. Each of the configurable components 302, 304, 306, 308 is controlled by the executive component 310.

The physical host interface component 302-1 is configured to communicate with the host computer 200. Data received at the physical host interface component 302-1 from the host computer 200 is placed in a buffer 302-3. Upon receiving data from the host computer 200, the physical host interface component 302-1 sends a synchronisation pulse, "Trig1", to the executive component 310

Data arriving from the host computer 200 may be pre-packaged at the host computer 200 into a pre-defined data structure. The physical host interface component 302-1 extracts the data from the pre-defined data structure and stores it in a buffer 302-3 ready to be used by the data formatting and manipulating component 302-2.

As described above, receipt of synchronisation pulse, "Trig1", causes the executive component 310 to cause the function group "run1( . . . )" to be executed sequentially in each of the data formatting and manipulating component 302-2, the first simulation component 304-1, the third simulation component 304-3, the second simulation component 304-2 and the target interface component 306. "Trig1" may also cause the function "run1( . . . )" to be executed in the control panel component 308. However, as this is not relevant to the flow of data through the update apparatus, this is not shown on FIG. 5.

Exemplary operations of configurable components 302, 304, 306 following execution of the "run1( . . . )" function group will now be described.

Execution of the "run1( . . . )" function in the data formatting and manipulating component 302-2 causes the data formatting and manipulating component 302-2 to examine the data in the buffer, to format/manipulate the data as required and place the formatted/manipulated data in a first data structure DS-A.

In some cases, the data arriving at the physical host interface 302-1 is not pre-packaged into a pre-defined data structure, for example, because it is not possible to modify the software of the host computer 200. In such cases the data formatting and manipulating component 302-2 manipulates the data as required and outputs and stores it in the first data structure DS-A. In some examples, the data formatting and manipulating component 302-2 may comprise two separate components, one which is for formatting the data and another which is for manipulating the data, should it be required.

The first simulation component 304-1 is configured to perform internal interface functions between the host interface component 302 and the second and third simulation components 304-2, 304-3. In other words, the first simulation component 304-1 is operable to convert data received host interface component 302 into a format that can be utilised by the second and third simulation components 304-2, 304-3. In this example, upon receipt of the "run1( . . . )" function, the first simulation component 304-1 separates and/or processes the data that is stored in the first data structure DS-A and places it in second and third data structures DS-B, DS-C.

The third simulation component 304-3 is a secondary simulation component that provides additional functionality and data manipulation to enhance the functionality of the primary simulation component(s), which is, in this example, the second simulation component 304-2. Following receipt of the "run1( . . . )" function, the third simulation component 304-3 processes the data stored in the third data structure DS-C and places it in a fourth data structure DS-D.

The second simulation component 304-2 is a primary simulation component that performs the core functionality required by the VIG subsystem 204 being added to the existing computer environment. The second simulation component 304-2, following receipt of the "run1( . . . )" function, reads data from the second and fourth data structures DS-B, DS-D. The second simulation component is configured to process the data and place it in a fifth data structure DS-E.

The target interface component 306 is configured to communicate with the new VIG subsystem 204 that is to be interfaced with the existing host computer 100. Data that is to be output to the new VIG subsystem 204 is stored in a buffer (not shown).

The interface between the host computer 200 and the update apparatus 206 may be via Ethernet. Alternatively, however, the interface may be via, but is not limited to, any of the following protocols: Raw, UDP, TCP/IP. An appropriate physical host component 302-1 and an appropriate data formatting and manipulating component 302-2 are selected depending on the protocol required.

Figure 6:
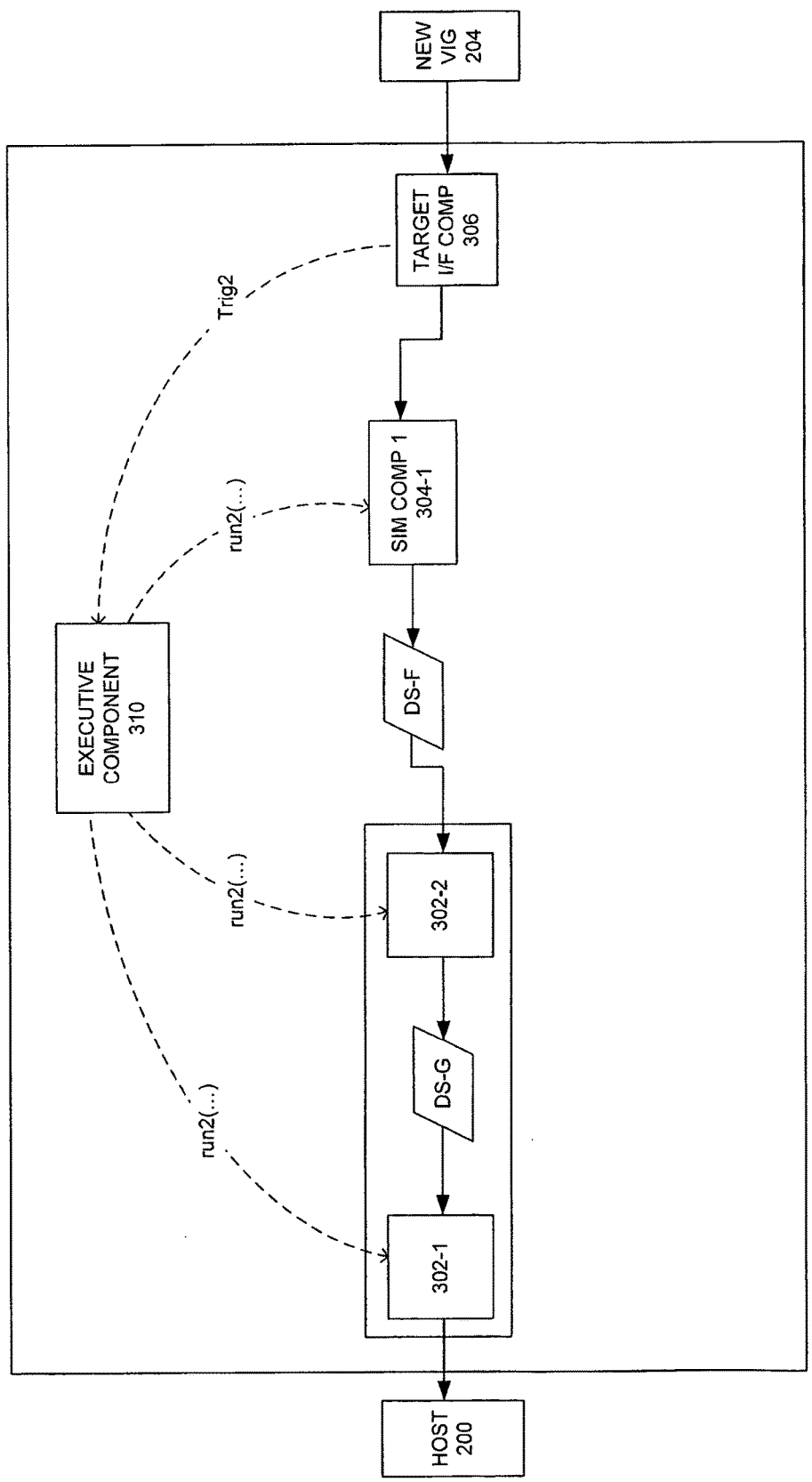
FIG. 6 is a simplified schematic showing an exemplary flow of data in a second direction through the apparatus of FIG. 3.

FIG. 6 illustrates an example of the transfer of data from the new VIG subsystem 204 to the host computer 200 through the update apparatus 206. Those components of the update apparatus 206 which are not involved in this exemplary data transfer are not shown in FIG. 6.

The target interface component 306 is responsive to receiving data from the new VIG subsystem 204 to write the data into a buffer (not shown) and to send a synchronisation pulse, "Trig 2", to the executive component 310. The target interface component 306 is operable also to unpack the data received from the new VIG subsystem 204 and to store it in a sixth data structure DS-F.

The executive component 310 is responsive to receiving the synchronisation pulse "Trig2" from the target interface component to sequentially execute the "run2( . . . )" function in each of the first service component 304-1, the data formatting and manipulating component 302-2, and the physical host interface component 302-1.

Following execution of the "run2( . . . )" function, the first simulation component 304-1 reads the data from the fifth data structure DS-F, processes it and stores the processed data in a sixth data structure DS-G.

The data formatting and manipulating component 302-2 then reads the data from the first data structure DS-G, re-formats it into a format that is readable by the host computer 200, and stores it in a buffer (not shown). The physical host interface component 302-1 is operable, following execution of the "run2( . . . )" function to pass the data from the buffer (not shown) to the host computer 200.

It can be seen that the return path of the data from the new VIG subsystem 204 to the host computer does not require the second and third simulation components 304-2, 304-3. As such, the "run2( . . . )" function is not included in these components.

Figure 7A:
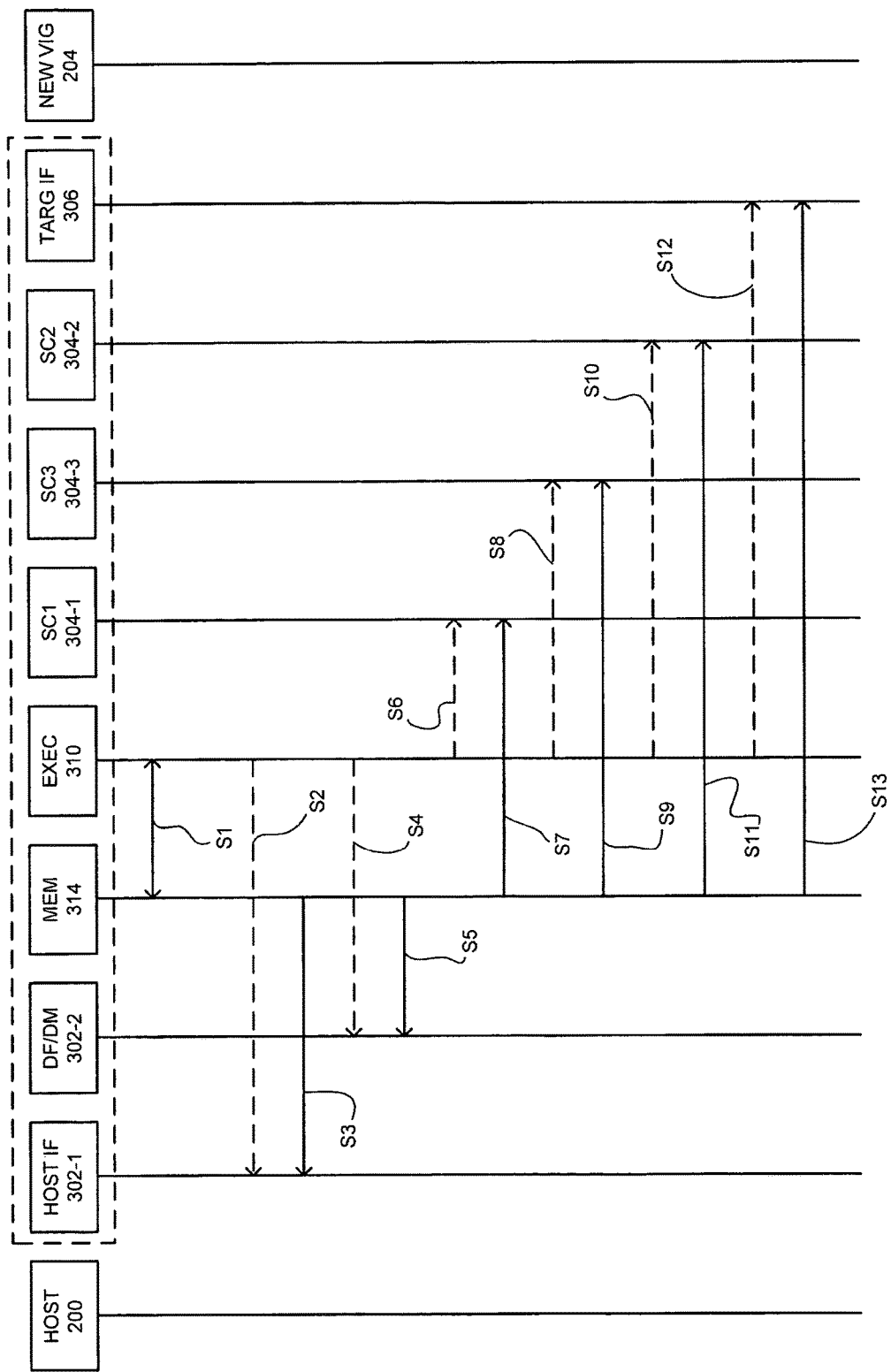
FIGS. 7A to 7C are alternative illustrations of the operations described with reference to FIGS. 4, 5 and 6 respectively.
Figure 7B:
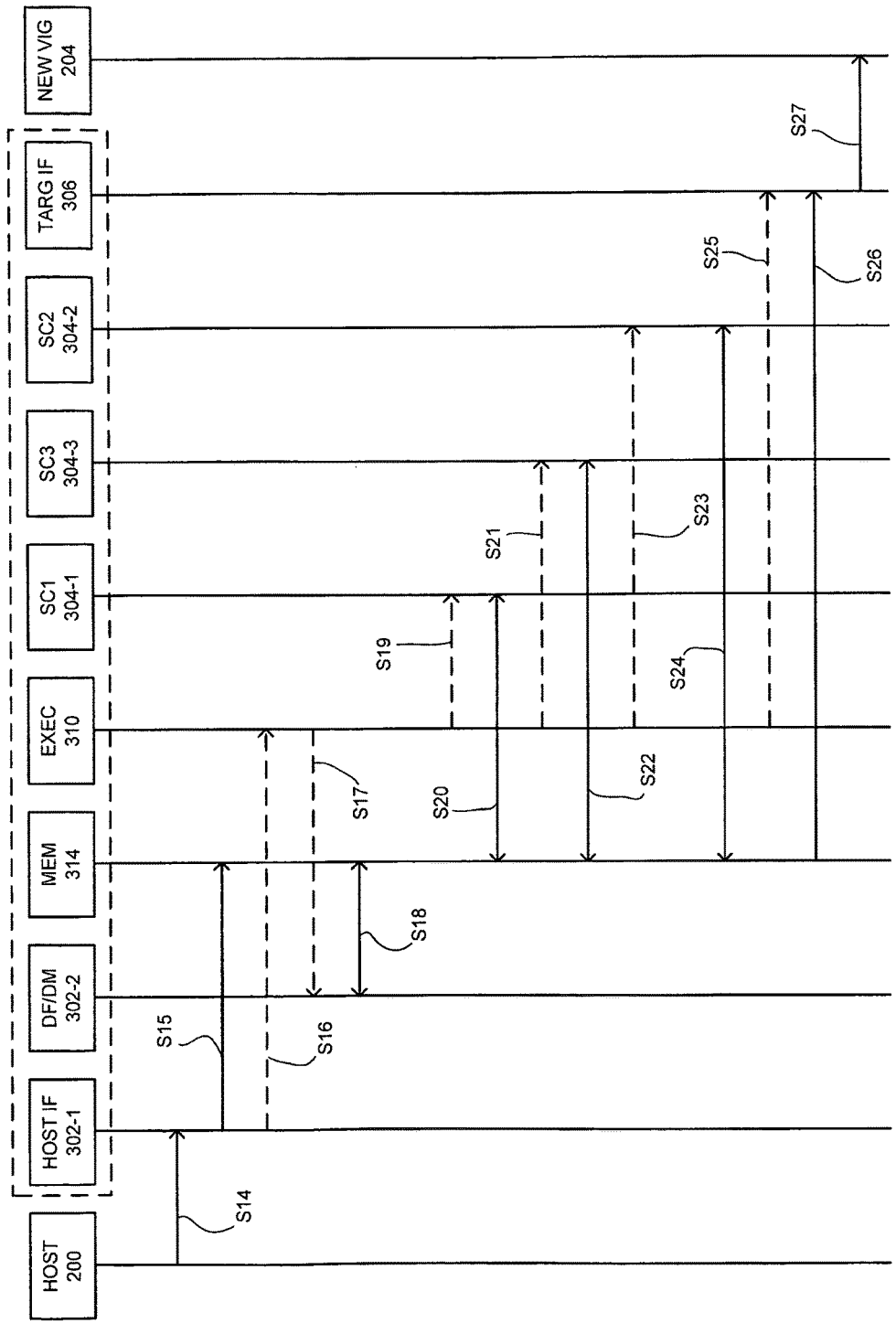
Figure 7C:
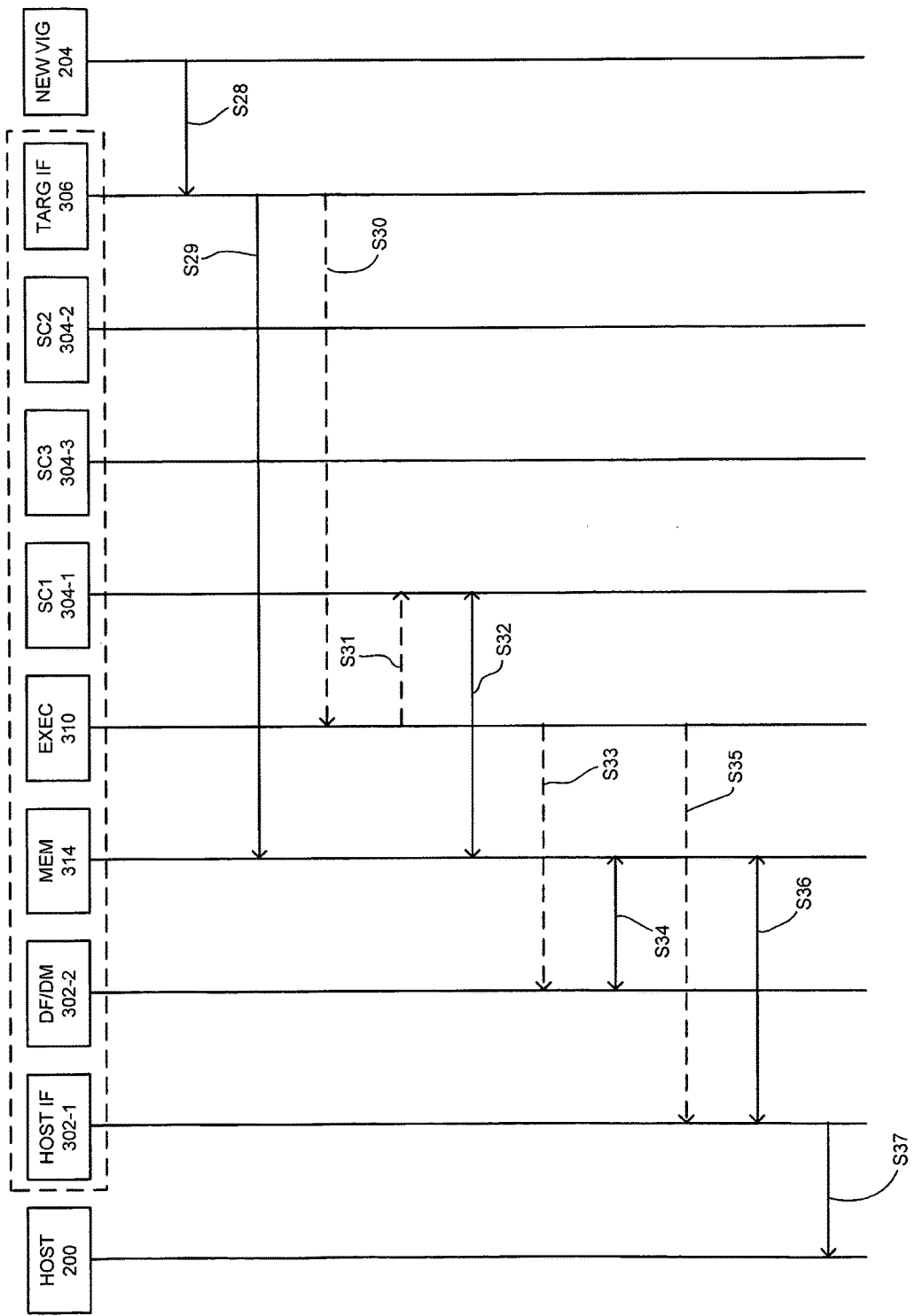

FIGS. 7A to 7C are alternative illustrations of the operations described with reference to FIGS. 4 to 6 respectively.

FIG. 7A illustrates the initialisation of the update apparatus 206 according to an exemplary embodiment of the invention. In step S1 of FIG. 7A, the executive component 310 reads the executive initialisation file 400, for example NUQ.ini, and causes the information to be written to memory 314.

In step S2, based on the information from the executive initialisation file 400, the executive component 310 causes the physical host interface component 302-1 to be loaded. In step S3, based on a command signal received from the executive component 310, the physical host interface component 302-1 reads its initialisation file 402 as defined in the executive initialisation file 400 (in the above example "HostIf.ini") from the memory 314.

In step S4, based on the information from the executive initialisation file 400, the executive component 310 causes the data formatting and manipulating component 302-2 to be loaded. In step S5, based on command signals received from the executive component 310, the formatting and manipulating component 302-2 reads its initialisation file 404 as defined in the executive initialisation file 400 (in the above example "DM.ini") from the memory 314.

In step S6, based on the information from the executive initialisation file 400, the executive component 310 causes the first simulation component 304-1 to be loaded. In step S7, based on command signals received from the executive component 310, the first simulation component 304-1 reads its initialisation file 406 as defined in the executive initialisation file 400 (in the above example "SC1.ini") from the memory 314.

In step S8, based on the information from the executive initialisation file 400, the executive component 310 causes the third simulation component 304-3 to be loaded. In step S9, based on command signals received from the executive component 310, the third simulation component 304-3 reads its initialisation file 406-3 as defined in the executive initialisation file 400 (in the above example "SC3.ini") from the memory 314.

In step S10, based on the information from the executive initialisation file 400, the executive component 310 causes the second simulation component 304-2 to be loaded. In step S11, based on command signals received from the executive component 310, the second simulation component 304-2 reads its initialisation file 406-2 as defined in the executive initialisation file 400 (in the above example "SC2.ini") from the memory 314.

In step S12, based on the information from the executive initialisation file 400, the executive component 310 causes the target interface component 306 to be loaded. In step S13, based on command signals received from the executive component 310, the target interface component 306 reads its initialisation file 408 as defined in the executive initialisation file 400 (in the above example "TARGIF.ini") from the memory 314.

Although not shown on FIG. 7A, the executive component 310 may, based on the executive initialisation file 400, cause the other configurable components, such as the control panel component 308 to the loaded and to be configured by reading its initialisation file 410 from the memory 314.

It is appreciated that steps S2, S4, S6, S8, S10 and S12 may be performed simultaneously or in any particular order. The reading of the initialisation files by the loaded components occurs after the components have been loaded.

FIG. 7B illustrates an operation of the update apparatus to cause data from the host computer 200 to be transferred to the new VIG subsystem 204. In step S14, data is received from the host computer 200 at the physical host interface component. 302-1.

In step S15, the data received from the host computer 200 is placed in a buffer, which may be part of memory 314, by the physical host interface component. 302-1.

In step S16, the physical host interface component. 302-1 sends a synchronisation pulse, "Trig1", to the executive component 310 to notify it that data has been received from the host computer 200.

The way in which the executive component reacts 310 to receiving the synchronisation pulse from the physical host interface is defined in the "TRIGGERS" section of the initialisation file 400, and in this example "Trig1" of "NUQ.ini". Consequently, in step S17, in response to receiving the synchronisation pulse, the executive component 310 sends a command signal to the data formatting and manipulating component 302-2 which causes the data formatting and manipulating component 302-2 to execute the "run1( . . . )" function.

In response to the execution of the "run1( . . . )" function, in step S18, the data formatting and manipulating component 302-2 reads the data from the buffer, formats it an places it in the first data structure DS-A which is stored in shared memory, for example memory 314.

Next, in step S19, the executive component 310 sends a command signal to the first simulation component 304-1 which causes the first simulation component 304-1 to execute the "run1( . . . )" function.

In response to the execution of the "run1( . . . )" function, in step S20, the first simulation component 304-1 reads the data from the first data structure DS-A in the shared memory 314, operates on the data and places it in to second and third data structures DS-B, DS-C which are stored in the shared memory 314.

In step S21, the executive component 310 sends a command signal to the third simulation component 304-3 which causes the third simulation component 304-3 to execute the "run1( . . . )" function. The third simulation component 304-3 responds to this in step S22 by extracting the data from the third data structure DS-C, operating on it and placing the result into the fourth data structure DS-D.

Subsequently, in step S23, the executive component 310 sends a command signal to the second simulation component 304-2 which causes the second simulation component 304-2 to execute the "run1( . . . )" function. The second simulation component is responsive to this, in step S24, by extracting data from both the second and fourth data structures DS-B, DS-D, operating on it and placing the resultant data into a fifth data structure DS-E.

In step S25, the executive component 310 sends a command signal to the target interface component 306 which causes the target interface component 306 to execute the "run1( . . . )" function. The target interface component 306 responds to this by, in step S26, reading the data from the fifth data structure DS-E and, in step S27, sending it to the new VIG subsystem 204.

FIG. 7C illustrates an operation of the update apparatus to cause data from the new VIG subsystem 204 to be transferred to the host computer 200.

In step S28, data is received at the target interface component 306 from the new VIG subsystem 204. In step S29, the data received from the new VIG subsystem 204 is placed in a buffer, which may be part of memory 314, by the target interface component 306.

In step S30, the target interface component 306 sends a synchronisation pulse, "Trig2", to the executive component 310 to notify it that data has been received from new VIG subsystem 204.

The way in which the executive component reacts 310 to receiving the synchronisation pulse from the target interface component is defined in the "TRIGGERS" section of the initialisation file 400, and in this example "Trig2" of "NUQ.ini". Consequently, in step S31, in response to receiving the synchronisation pulse, the executive component 310 sends a command signal to the first simulation component 304-1 which causes the first simulation component 304-1 to execute the "run2( . . . )" function.

In response to the execution of the "run2( . . . )" function, in step S32, the first simulation component 304-1 reads the data from the buffer, operates on the data and places it into a sixth data structure DS-F, which is stored in the shared memory 314.

Next in step S33, the executive component 310 sends a command signal to the data formatting and manipulating component 302-2, which causes the data formatting and manipulating component 302-2 to execute the "run2( . . . )" function.

In response to the execution of the "run2( . . . )" function, in step S34, the data formatting and manipulating component 302-2 extracts the data from the sixth data structure DS-F, processes and/or formats it, and places it into a seventh data structure DS-G which is stored in shared memory, for example memory 314.

Next, in step S35, the executive component 310 sends a command signal to the physical host interface component 302-1 which causes the physical host interface component 302-1 to execute the "run2( . . . )" function. The physical host interface component 302-1 responds to this by, in step S36, reading the data from the seventh data structure DS-G and, in step S37, sending it to the new host computer 200.

In the above-described embodiments, there is one physical interface between the new subsystem 204 and the update apparatus 206, and one physical interface between the update apparatus 206 and the host computer 200. It will be appreciated, however, that there may be plural physical interfaces between the new subsystem 204 and the update apparatus 206 and/or between the update apparatus 206 and the host computer 200. Data arriving at the update apparatus via one physical interface may be operated on by a different set of configurable components than is data arriving via a second physical interface. As such, there may be more that one path through the update apparatus via which data travelling to or from a simulation component passes. Similarly, data may arrive at the update apparatus 206 via a single physical interface, but may be split such that it subsequently travels through the update apparatus 206 via two or more different sets of configurable components.

Details of one specific implementation will now be provided. These details complement the above description, and are useful in demonstrating how the invention can be implemented in the C++ programming language. The following is a description of the simulation components for a specific exemplary embodiment of the update apparatus 206 when integrating a new visual subsystem with an existing host computer 200.

NUQLEUS™ Software Components

The system and interface specific functionality of the NUQLEUS™ system is provided by a set of software components contained in individual shared object libraries.

There is no practical limit to the number of NUQLEUS™ components that may exist on a given system.

Each component can provide two core functional paths depending on the interfaces required by the software. Typically path 1 is used to manipulate data originating from the existing Computer system ready for use by another NUQLEUS™ Component or transmission to the new subsystem. Path 2 is typically used from the return path, ie manipulation of data originating from the new subsystem ready for use by other software components or transmission back to the original Computer system.

Each Component is based on a standard template containing placeholders for four critical functions that are required to interface with the NUQLEUS™ Executive. These functions are:

1. init( ) Invoked on NUQLEUS™ Initialisation to provide any bespoke initialisation of the NUQLEUS™ Component
2. run1( ) Invoked by the NUQLEUS™ Executive to execute one of the 2 functional paths. (typically from the existing system to the New subsystem)
3. run2( ) Invoked by the NUQLEUS™ Executive to execute one of the 2 functional paths. (typically from the new subsystem to the original System)
4. term( ) Invoked by the NUQLEUS™ Executive on a commanded exit or detection of a serious error to perform any necessary clean up operations for the NUQLEUS™ Component.

NuqCodes™

Data required by NUQLEUS™ components is packaged into NuqCodes. A NuqCode™ provides a specific packet of information that is required by one or more components.

Communication between individual NUQLEUS™ Components is achieved using NuqCodes. Each NUQLEUS™ Component has a subset of the available NuqCodes™ defined as inputs and another subset as outputs.

NuqCodes™ exist in shared memory and are created as required by the Components as they are dynamically loaded by the Executive. Benefits of this approach include the ability to dynamically configure the Host Interface buffer without recompilation of Source files and enabling the interchanging of different NUQLEUS™ Components at runtime.

Figure 8:
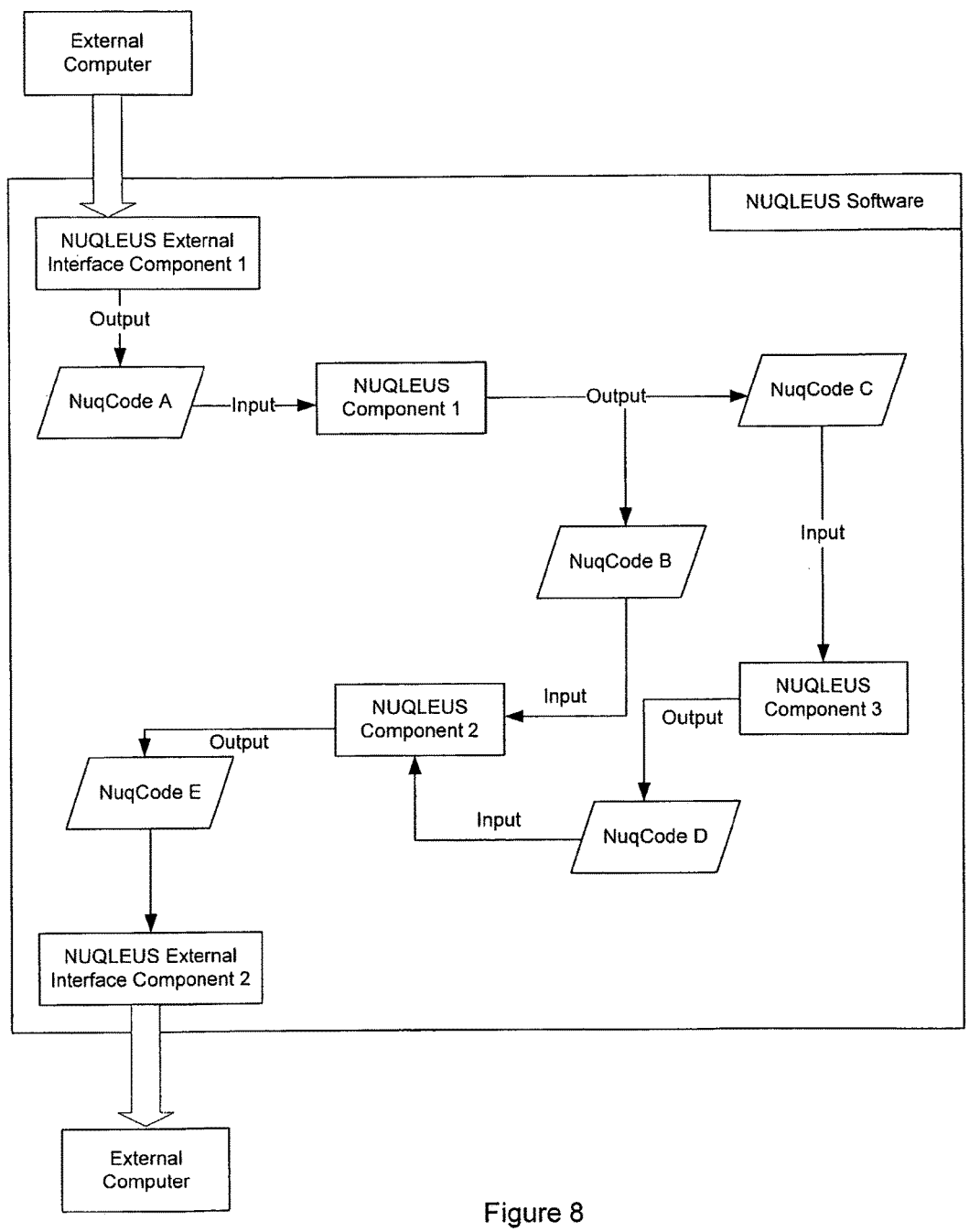
FIGS. 8 to 14 illustrate features of one specific implementation of the invention and their interconnection.

FIG. 8 demonstrates the data transfer between NUQELUS Components. FIG. 8 demonstrates a number of mutually exclusive data interfaces that are controlled via an executive interface.

NUQLEUS™ External Interface Component 1

This component is configured to communicate with an existing external computer system. Received data is dynamically unpacked and placed into NuqCode™ A.

NUQLEUS™ External Interface Component 2

This component is configured to communicate with an external computer system that is to be interface with an existing computer. Data that is to be output from NUQLEUS™ is dynamically packed from data held in NuqCode™ E.

NUQLEUS™ Component 1

This component performs internal interface functions between External Interface Component 1 and the NUQLEUS™ Simulation Components. Data held in NuqCode™ A is processed and separated according to function. This data is output to NuqCodes™ B & C.

NUQLEUS™ Component 2

This component is a primary Simulation component that performs the core functionality required by the System being added to the existing computer environment. Inputs to this component are from NuqCodes™ B & D, all outputs from this component are contained in NuqCode™ E.

NUQLEUS™ Component 3

This component is a secondary Simulation component that provides additional functionality and data manipulation to enhance the functionality of the Primary NUQLEUS™ Simulation Components. Inputs to this component are from NuqCodes™ C, all outputs from this component are contained in NuqCode™ D.

Each of the NUQLEUS™ Components is dynamically configurable at run time through a set of configuration files.

A similar communication path operates for data returned from the new subsystems. The library of NUQLEUS™ components can grow over time without affecting previously released software executables. As the number of interfaces required between NUQLEUS™ Components is increased then the number of available NuqCodes™ also increases. This provides backwards compatibility with all versions of the system.

NUQLEUS™ Example Configuration

The NUQLEUS™ Configuration is achieved at runtime by the NUQLEUS™ Executive using a system of initialisation files.

The following example of the NUQ.ini file is shown to describe how the file is used. The description of the fields follows the example.

| NUQ.ini |
| --- |
| [TRIGGERS]<br>Trig1=HOST_IF, run1, DataManipulator,SC1,SC2,VIS_IF,SC_IO<br>Trig2=EXT_IF, run2, SC1, DataManipulator,HOST_IF<br>Trig3=RACK_IF, run2, SC_IO<br>Trig4=EGPWS_IF, run2, SC_AVIOINCS<br>[HOST_IF] |

| NUQ.ini |
| --- |
| -continued |
| load = ./RAW.so<br>iniFile = HostIf.ini<br>[DataManipulator]<br>load=DM.so<br>iniFile=DM.ini<br>[SC1]<br>load = ./cSimCompOne.so<br>iniFile=SC1.ini<br>[SC2]<br>load = ./cSimCompTwo.so<br>iniFile = SC2.ini<br>[SC_IO]<br>load = ./IO.so<br>iniFile = IO.ini<br>[SC_AVIONICS]<br>load = ./Avionics.so<br>iniFile = Avionics.ini<br>[EXT_IF]<br>load = ./RAW.so<br>iniFile = VisIf.ini |

Triggers

The TRIGGERS section effectively defines 3 items of data:

The first parameter defines the Simulation Components that notifies NUQLEUS™ when data has arrived at their interface The second parameter defines the function group that runs in response to this trigger Parameters 3 onwards define which Simulation Components should run in response to this trigger and the sequential order in which they should run.

e.g. In the example file above, Trig1 runs the function run1( ) sequentially in each of the DataManipulator, SC1, SC2, VIS_IF,and finally SC_Rack.

It is noted that the highlighted Simulation Component is where the data is output from NUQLEUS™. It shows is that further Simulation Components can be run after data is output, i.e. it shows the existence of the facility to run non-critical software after critical data has been output.

The Simulation Component reference applies to another section in the ini file, e.g HOST_IF section appears further down the ini file.

As a result of a Simulation Component being defined in the TRIGGERS section, the NUQLEUS™ Executive calls the function setReference within this Simulation Component to the specific trigger number. The Simulation Component holds this reference as a member variable. All Simulation Components that act as triggers include a member function setReference.

When data arrives at the Simulation Component interface, the NUQLEUS™ Executive is informed: specifically, the function processData is called with the parameter set to the saved (member variable) reference number. In order for a component to call processData, the component is is given the address of this callback function. This is achieved using polymorphism, which is a feature of C++:

Base cNUQLEUS™ class on an abstract class

Pass the address of the cNUQLEUS™ object to the Trigger component constructor (using 'this', but passing it as a pointer to the abstract class)

This pointer can then be used to call processData from within the Trigger component The second parameter for the Key/Value pairs within the TRIGGERS section indicates what function group should run as a result of this trigger, e.g. run1( ).

In summary, the TRIGGERS section indicates which Simulation Components trigger a function group Simulation Components A section is defined for each Simulation Component. Each Simulation Component is is built as a Linux Shared Object. The settings for each Simulation Component indicate the name of the Shared Object to load and the initialisation file that is read by that component at start-up, e.g. in the example above, the HOST_IF Simulation Component is built as the Shared Object RAW.so and reads the initialisation file HostIf.ini.

The NUQLEUS™ Executive accomplishes the loading of Shared Objects, as described below.

Executive Framework

The NUQLEUS™ architecture is outlined as follows:

Each deliverable NUQLEUS™ product consists of a number of Simulation Components, each satisfying a particular requirement of NUQLEUS™.

These Simulation Components are dynamically loaded at start-up of NUQLEUS™.

A main NUQLEUS™ class acts as the controlling task, scheduling the Simulation Components in response to a sync pulse.

The sync pulse is supplied as a result of data arriving at one of the interfaces. Generally, there are two paths: one from host to the external interface (e.g. Visual) and one from the external interface back to the host. As a result, a sync pulse is triggered when data arrives from the host and similarly when data arrives from the external interface.

The sync pulse is passed back to the NUQLEUS™ executive, which results in NUQLEUS™ (sequentially) running functions in the other Simulation Components. Data from host to external interface results in the function 'run1( )' being (optionally) invoked in each of the Simulation Components; whereas data from the $2^{nd}$ external interface results in the function 'run2( )' being (optionally) invoked in each of the Simulation Components. Not all Simulation Components may require run1( ) and run2( ) processes, and they only need to be written/included in the Simulation Component where required.

The NUQLEUS™ interface to the host is Ethernet, but may be any of the protocols Raw, UDP, TCP/IP. The appropriate Simulation Component is selected to support whichever protocol is required.

Data arriving from the host is (usually) pre-packaged (at the host) into pre-defined NUQLEUS™ Codes. The Ethernet Interface Simulation Component extracts the data, ready to be used by the Data Formatter/Data Manipulator.

The Data Formatter component is configured to run after the Host Ethernet component. It examines the host data buffer, formatting the data into standard NUQLEUS™ codes. The resultant data is loaded into structures, within Shared Memory. Should non-standard NUQLEUS™ Codes exist or the host software is unable to be changed (e.g. no sources), then the Data Manipulator is required.

The Data Manipulator performs a very similar function to the Data Formatter, but handles any non-standard NUQLEUS™ Codes. The Data Manipulator is simulator specific and is designed/implemented by a system engineer. Again, the resultant data is loaded into structures, within Shared Memory One or more application specific Simulation Components take the NUQLEUS™ Code data and perform whatever functions are required, e.g. formatting the data for output to a Visual system.

Classes

This section provides information on the order that the software is implemented:

1. typedefs.h
2. templates.h
3. cIniFile class
4. Main NUQLEUS™ program (nuqMain.cpp)
5. cSharedMem class
6. cNUQLEUS™ class and its base abstract class cNUQLEUS™ Base
7. NUQLEUS™ code header files (nuqCode<Num>.h)
8. cHostIf class—a trigger class that provides the interface to the existing Host Computer
9. cVisIf class—a trigger class that provides the interface to the VIG system being added to the Simulator
10. endianSwap template
11. cDataFormatter class
12. cDataManipulator class
13. cSimComp1 class—a Simulation Component that provides Software Simulation models for the update
14. cSimComp2 class—a Simulation Component that provides Software Simulation models for the update.
15. IEEE conversion template Abstract Class for Base of cNUQLEUS™

It has already been mentioned that an abstract class is required on which to base the cNUQLEUS™ task. This enables NUQLEUS™ created components to call functions held within the NUQLEUS™ class. Specifically, it is required by the interface Simulation Components to inform NUQLEUS™ when data has arrived, i.e. to support the triggering mechanism. The abstract class includes a header file and takes a format similar to below:

```
#pragma once
class cNUQLEUS ™ Base
{
    public:
        virtual void processData(unsigned short) = 0;
};
```

Main Class—cNUQLEUS™

Basic Functionality

This class includes the following functionality:

Provide the ability to load Simulation Components dynamically. This allows the configuration to change without re-compilation Support an initialisation file that defines various parameters to control the operation of NUQLEUS™ and in particular the specific Simulation Components to be loaded Load and initialise the Simulation Components, whilst passing the name of a specific initialisation file to the Simulation Component.

Call specific function within each Simulation Components when data arrives at an interface Operation The class operates to:

Read in its initialisation file (i.e. NUQ.ini)

Store the information in such a way to allow the data within to be readily used

Load each Simulation Component in such a way to allow functions within the Simulation Component to be called Start whatever Simulation Components are responsible for providing a synchronisation pulse.
  Currently, this is only whichever Simulation Component is responding to the arrival of data at an interface.
  There is an interface to the host and their is an interface to the Visual
Enter a loop that takes 'no time' where it can respond to control requests (e.g. Stop, reload, start etc.)
As a result of external triggers (from any interface Simulation Component), NUQLEUS™ invokes functions within each of the Simulation Components.
Typically, for data from (for example) Host to a Visual system, the functions invoked within each Simulation Component is run1( ), whereas data going in the opposite direction (Visual to Host) results in the run2( ) functions being called.
To enable the requirement to support the display of part number, then the NUQLEUS™ class should include information on it's part number and enable all components to return information on their part numbers. Version information is included. The part number information may be held inside the initialisation files (NUQ.ini etc), or may alternatively be held inside the C++ implementation source files. This is achieved by:
  char m_szRevision[ ]="$Revision: $";
  char m_szPartNumber[ ]="<enter part number>";
In some embodiments, these variables and accessor functions are put inside a generic class and 'all' classes are based on this.
  Supporting class features:
  Initialisation File reader (see 'Initialisation File Reader/Writer—cIniFile')
  An abstract class to allow Simulation Components created by NUQLEUS™ to call functions in NUQLEUS™ (this is described below).
cNUQLEUS™.cpp and cNUQLEUS™.b
  This class constitutes the main class for the NUQLEUS™ framework.
  The entry point is the function 'run( )'
  The class is based on cNUQLEUS™ Base. The enables the use of polymorphism to allow any classes created/loaded by NUQLEUS™ to make a callback to NUQLEUS™. This is achieved by all classes that are loaded, being passed a pointer to this base class. This base class is then used by these 'subclasses' to call the function processData within cNUQLEUS™. Note: processData is defined as a pure virtual function.
  When the cNUQLEUS™t object is constructed, it loads member variables with part number and the current version of NUQLEUS™.
  The framework is started by calling the member function run( ). As a result of this, the class:
    Sets the Working Folder to $NUQLEUS™/bin (which simplifies the dynamic loading of Simulation Components and locating of initialisation files etc.)
    Checks the size of all data types held within types.h to ensure that the sizes are consistent with the operating system
    Waits until it is instructed to start (via psControl→bRun)
    Reads the NUQLEUS™.ini file
    Loads the Simulation Component shared objects as defined within NUQLEUS™.ini
    Enters a loop (within the function bg) that only exits on Control C or psControl→bExitRequested.
    Within this loop it checks that the all NUQLEUS™ code versions are OK,
  When each Simulation Component is loaded, the NUQLEUS™ framework calls the init function for that Simulation Component. The init function is defined as a pure virtual function, so is declared for all Simulation Components. Parameters are passed to each Simulation Component within this init function: a pointer to the NUQLEUS™ abstract base class, the trigger reference and the initialisation file (as defined within NUQLEUS™.ini). The Trigger Reference is set to −1 for all Simulation Components that are not being used as triggers; whereas it holds the index into the list of Simulation Trigger Components for the triggers (the order is as defined in NUQLEUS™.ini).
  The real time aspect of the framework is realised by other Simulation Components, specifically those defined as triggers. When a 'trigger' Simulation Component receives data, it notifies NUQLEUS™ via processData function, using the NUQLEUS™ Base class to do this (as mentioned above).
  A mutex lock is defined within processData to ensure that only one Simulation Component can invoke processData at any one time. This avoids problems with sharing data. At the start of processData the mutex is created; it is released at the end of processData. As a result, should any Simulation Component call processData whilst it is being used, that Simulation Component is held-off by the Operating System until the mutex is released.
  When NUQLEUS™ is closed down, the framework calls the 'destroy' functions for all Simulation Components. Note: The 'term' function is optional for all Simulation Components: if it is missing, then the cNUQLEUS™ Base version is called instead.
Initialisation File Reader/Writer—cIniFile
Basic functionality
  This class includes the following functionality:
  Provide the ability to read/write to an initialisation file.
  Interface is 'simple', so that any System Engineer can use with minimal difficulty.
  Operation
  The minimum set of functions are:
    constructor—with overridden default constructor to allow name of initialisation file to be passed, read initialisation file into memory. Subsequently added default constructor allows loading of ini file to be delayed until load function is called.
    getIniSetting—With parameters of Section name and Key Name, return a value e.g. See below. Providing <Section> and <Key, return the value:

[<SECTION>]
<Key>=<Value> getSectionData—With parameter of <Section>, return all key/value pairs e.g. See below. Providing <Section> return all key/value pairs

[<SECTION>]
<Key1>=<Value1>
<Key2>=<Value2>
<Key3>=<Value3> putIniSetting—With parameters of Section name, Key name and value, add/edit existing details in the memory copy of the file.

removeIniSetting—With parameters of Section name and Key name, delete the settings from the memory copy of the file save—Save the memory copy of the initialisation file saveAs—Save the memory copy of the initialisation file as another inifile Shared Memory Class—cSharedMem The manner of sharing data between the Simulation Components is managed using Linux Shared Memory. A class created during the Real-Time Host Development program makes use of Shared Memory 'simple'. The class is called cSharedMem and requires two files: cSharedMem.cpp and cSharedMem.h.

An example of its use is shown below:

```
typedef struct
{
    UINT_4 ui4Code;
    double dLat;
    double dLon;
} tNQ100;
tNQ100* poNQ100;
cSharedMem oNQ100((void**)&poNQ100, sizeof(tNQ100), 100);
```

In this example a (very minimal) structure is defined that is for a fictional NUQLEUS™ Code 100. The typedef tNQ100 declares this structure. A pointer to a structure of this type is defined by the variable poNQ100. A Shared Memory segment is defined with a key of 100 (to match the NUQLEUS™ Code) using the cSHared Mem constructor. As a result of calling this constructor, the poNQ100 structure may be used to access any member of the NUQLEUS™ Code 100 structure.

Any Simulation Component that requires access to this shared memory also includes the definition of the oNQ100 shared memory variable. This automatically attaches to the Shared Memory (if it exists already) or creates the shared memory (if it does not exist).

When any Simulation Component is destroyed (on exit perhaps or reload), the Shared Memory is automatically disconnected. The final Simulation Component that is closed automatically results in the Shared Memory being freed.

cNuqCode<xxx>.cpp and cNuqCode<xxx>.b

Each NUQLEUS™ Code has an implementation defined (within a class). The class is based on the cNuqCode™ and cNuqCodeBase classes.

The following member functions are supplied for each NUQLEUS™ Code:

Constructor, with the appropriate initialisation parameters
loadNuqCodeShMem
And optionally:
Destructor And the following functions are defined as external C functions:

create
destroy

Full details are not given here, since they intuitive if compared to an existing NUQLEUS™ Code implementation. A template may be created to facilitate the process of creating a new NUQLEUS™ Code. An instance of the cNuqCodexxx class is automatically created by the Data Formatter as a result of the initialisation files defining that this NUQLEUS™ Code is required.

cNuqCodeBase.cpp and cNuqCodeBase.b

Every NUQLEUS™ Code that is to be dynamically loaded is based on this class.

It enables the cDataFormatter class to dynamically load any NUQLEUS™ Code. The class is defined as pure virtual, so can never be used directly.

cNuqCode.cpp and cNuqCode.b

This class is also use by all NUQLEUS™ Codes as their base class. It provides a 'wrapper' around the cSharedMem class for the code. The main features of the class (in addition to the cSharedMem functionality) is to provide automatic version checking of the NUQLEUS™ Code.

Endian Swap Class—cEndianSwap

The class consists of two template classes that support any data type:

endianSwapInt is used for any non-floating point data type endianSwapReal is used for any floating point data type Being a template design means that when using the class, the data type on which the class is operating is included within chevrons, e.g. to swap a long integer, the class is invoked as:

lSwappedVariable=endianSwapInt<long>lVariable;

Data Formatter Class—cDataFormatter

This class supports the unloading of host data into the NUQLEUS™ Codes (for data being passed from host to External Interface) and supports the unloading of NUQLEUS™ Codes into host data buffer (for data being passed from External Interface to host).

It is the base class for cDataManipulator: this being the class that handles the same functionality as the Data Formatter, but for non-standard NUQLEUS™ Codes.

In full, the Data Formatter (and Data Manipulator) classes handle the following:

Unloading/loading of host buffers and NUQLEUS™ Code shared memory structures

Endian swapping of data as required for the particular host platform

Conversion for IEEE 754 as required for the particular host platform

Ensuring that the data padding within the NUQLEUS™ Code structures does not cause problems (i.e. direct memcpy is not possible between host buffers and shared memory NUQLEUS™ Code structures)

Additional notes (as covered below):

The class also handles versioning information for each NUQLEUS™ Code.

cDataFormatter.cpp and cDataFormatter.b

This class handles the data arriving at a host interface and loads this data into NUQLEUS™ Code classes.

It expects the host data to be in shared memory as a continuous sequence of bytes.

The initialisation file for the Data Formatter defines the key for the host data shared memory and the NUQLEUS™ Codes hat are expected to be found within this data.

An example of the initialisation File is:

DF.ini

[NUQLEUS ™ Codes]
NUQ_CODE1=200
NUQ_CODE2=201
NUQ_CODE3=202
NUQ_CODE4=203
NUQ_CODE5=500

-continued

```
DF.ini

[BufferIn]
SH_MEM_KEY=1234
SIZE=576
[BufferOut]
SH_MEM_KEY=5678
SIZE=1280
[InputData]
BIG_ENDIAN=false
```

It automatically creates the NUQLEUS™ Codes listed under the section NUQLEUS™ Codes The BufferIn section defines the shared memory area for the host input data The BufferOut section defines the shared memory area for the host output data The InputData section defines whether the host is Big Endian (i.e. all bytes need to be swapped within NUQLEUS™)

Host and Interface Classes

To support display of the external host and External Interface buffers, these buffers are also loaded into shared memory.

This also facilitates the Data Formatter (and Data Manipulator) in reading this information. It also allows any Simulation Component to access the data if ever needed.

Hardware Solution

The hardware packing of NUQLEUS™ is a "black box" embedded solution. The front panel of NUQLEUS™ consists of an LCD interface to provide top level diagnostic and status information and Ethernet ports for the external interfaces plus an additional port for the Maintenance web front end.

Visual Simulation Component

Figure 9:
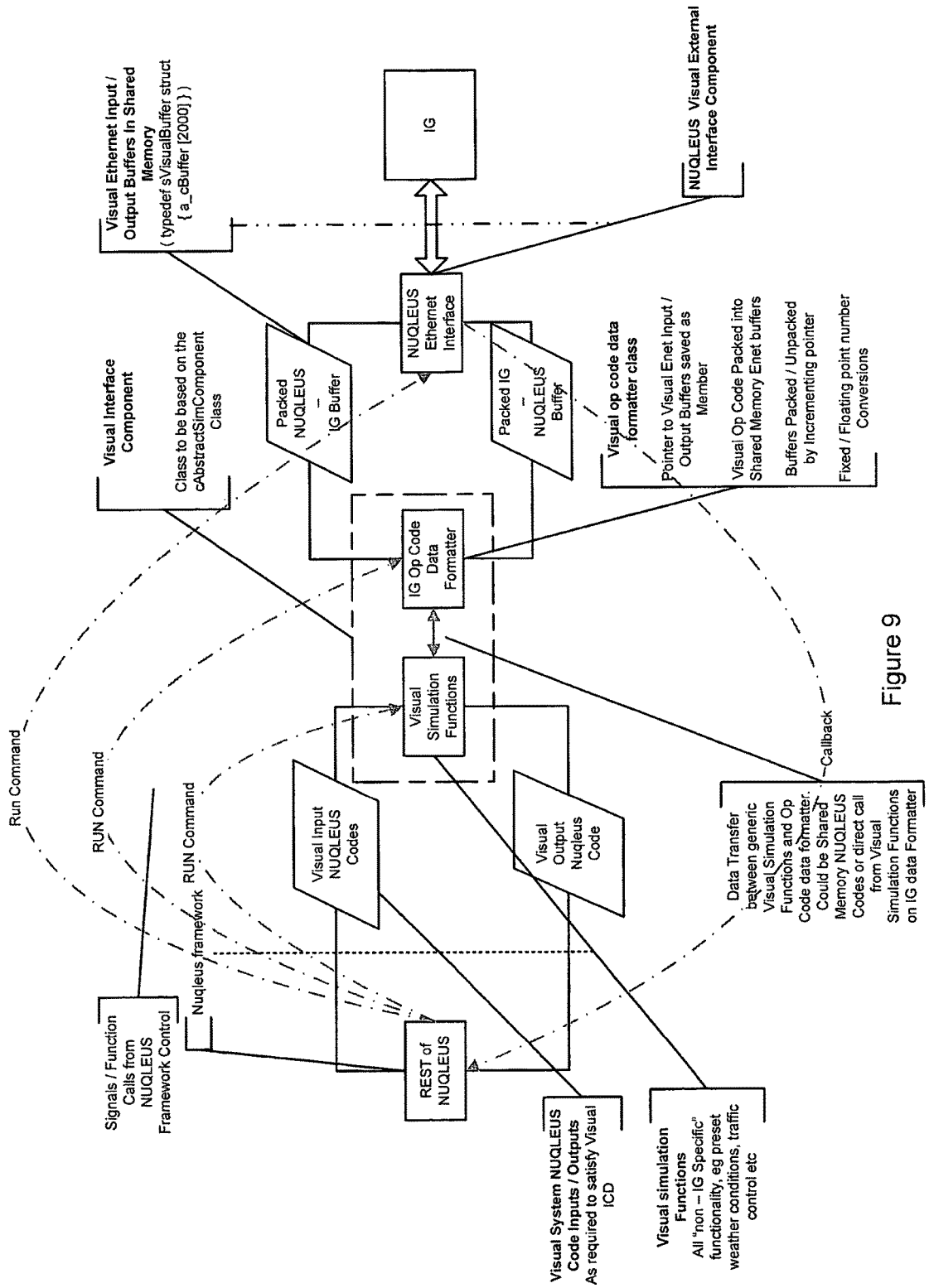

FIG. 9 shows the top level architecture for the visual simulation component.

The major constraint on the software design is the requirement for the component's classes to be based on the cAbsSimComponent class and for the final binary to be compiled as a Linux Shared object.

Linux shared objects are compiled using the -shared and -fPIC switches for the g++ compiler.

Shared Memory segments are created using the cSharedMemory class developed for the real Time Host system.

The Following sub components have been identified for the Visual Simulation Component:

NUQLEUS™ output Buffer to the IG Byte array of packed IG op Code data held in shared memory for transmission to the IG by the NUQLEUS™ external interface component NUQLEUS™ input buffer from the IG Byte array of unprocessed OP Code data held in shared memory and originating from the IG.

IG Op Code Data Formatter—Class or set of methods required to encode and decode IG Op Code in the NUQLEUS™ Input/Output buffers to the IG. includes floating point/fixed point notation conversions and routines for each op code defined by the OEM OCD.

Visual Simulation Functions Class containing all logic associated with visual simulation, including computations such as eyepoint offsets (if required), pre set weather conditions, routed traffic control etc Visual NUQLEUS™ Code Inputs Subset of all available NUQLEUS™ Codes providing all data required to drive the visual simulation features. These may originate from the Host Computer (via the data formatter ref DPC 4) or from other NUQLEUS™ Simulation components (eg TCAS)

Visual NUQLEUS™ Code Outputs Subset of all available NUQLEUS™ Codes containing all data output from the Visual Simulation including items such terrain feedback and status information for the instructor control panel The NUQLEUS™ Internal ICD for the Visual Simulation component consists of a definition of the NUQLEUS™ codes used as Inputs and outputs.

Figure 10:
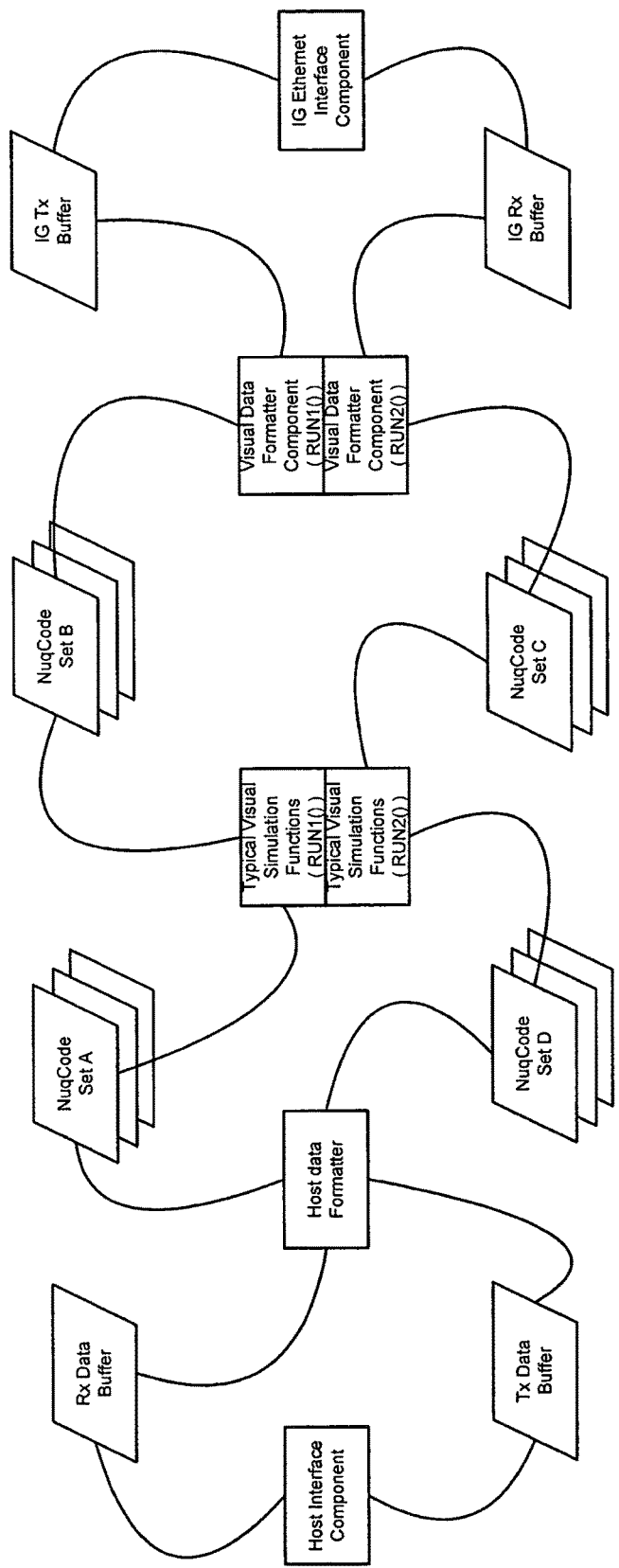

FIG. 10 shows top level NUQLEUS™ component communication paths. The Typical Visual Functions and IG data formatter form two independent simulation components. data is passed via defined subsets of NuqCodes. There is no direct route from the NUQLEUS™ Data formatter to the Op Code Formatter.

Whilst this approach is likely to delay the conversion of eyepoint position into the format required by the Visual (and its subsequent packing of the output buffer), the Ethernet output to the IG still requires all the identified components to have completed. Therefore the overall induced delay is nil.

IG Op Code Formatter

The IG Op Code formatter utilises pointers to the shared memory segments holding the IG external input/output buffers.

The IG Op Code formatter requires functionality to process data between engineering and IG OpCodes as defined in the Master CLI Opcodes Manual. As with all NUQLEUS™ Simulation Components the visual data formatter is derived from the cSimCompBase class. The visual data formatter makes use of the init( ) run1( ) and run2( ) methods of the cSimCompBase. The term( ) method may be omitted.

The class for this sim component includes the header files for any NuqCodes™ required to communicate with the other simulation components.

The formatted op code data is held in shared memory buffers that are passed to/from the IG using the Ethernet Interface task within the NUQLEUS™ Exec. The following paragraphs define the functionality of this component:

Class: cIGDataFmtr

Inherits from cSimCompBase

INI File Settings

Shared Memory Keys for TX & RX buffers for Ethernet Transfers between NUQLEUS™ and the IG Members Local copies of:

Pointers to shared Memory Ethernet buffers.

Pointers to NuqCodes

Instance of OpCode Translator class—provides methods to convert between engineering and IG data formats Init( ) Functionality Functionality:

1) Read INI File and save settings

2) Create/Attach to shared memory segment for Ethernet Transfer buffers

3) Save Local copy of pointer to shared memory and NuqCodes

Run1( ) Functionality

Run1( ) performs the formatting of data and packaging of the Ethernet Buffer ready for transmission to the IG. Data Inputs are in the form of defined NuqCodes™ plus a specific NuqCode™ with a set of transmit flags. All inputs originate from the VisualSimComponent.

The output is to a buffer held in shared memory that consists of a series of formatted and ordered OpCodes.

Functionality:
1) Pack Visual Ethernet Header
2) Initialise Pointer to Shared Memory Ethernet Tx Buffer
3) For each Visual Feature input:
Check for PACK&SEND required—NuqCode™ input of Boolean flags requried for this
IF (Space in Buffer)
Call required Pack <OpCode> Method with appropriate arguments from NuqCode™ Inputs
Increment Pointer by length (Op Code) Bytes
Clear PACK&SEND flag
Check Buffer Space remaining
Run2( ) Functionality Run2( ) performs the necessary functionality to unpack and decode any data in the Ethernet buffers returned from the IG. The input to this function is a Buffer held in shared memory consisting of a vary number of formatted OpCodes originating from the IG. Outputs from this function are to a series of NuqCodes™ in engineering units.

Functionality:
1) Check for Data in Shared Memory Buffer
2) Initialise Pointer to start of Ethernet Data
3) For each opcode in Shared Memory Buffer
Extract Opcode number
Invoke applicable Unpack <OpCode> method
Pack Applicable NuqCode™ data
Increment Pointer by Length(OpCode) bytes
Additional Methods In addition to the methods defined by the cBaseSimComp class the cVisDataFormatter requires methods to perform the following:

packOpCode<nnnn> Each IG Data Item requires a specific method to package the data into the format required by the IG.

Data to be packed is passed to the method by argument

Data is packed to the location defined by the incrementing pointer to the Ethernet Tx Buffer unpackOpCode<nnnn> Each IG Data Item requires a specific method to decode the data from the location indicated by an Incrementing pointer and convert the data into engineering format. Locations to store output Data is passed to the method by argument convert<number format> The IG requires data to be passed to/from it using fixed point notation. A number of methods is required to handle the conversion from the IEEE floating point formats to the Fixed point notation. The conversion algorithms are defined in the OEM ICD documentation. Routines convert from Fixed Point notation to the IEEE floating point formats.

Visual Simulation Functions

The Visual Simulation Functions provides the functionality typically required by visual systems. This includes functionality such as setting preconditioned weather settings (eg CAT II visibility).

The Visual Simulation functions are packaged into following groups:
 Visual System Control
 Ownship Visual Features
 Airport Visual Features
 Environmental Visual Features
 Moving Model Visual Features As with all NUQLEUS™ Simulation Components the Visual Simulation Component is derived from the cSimCompBase class. The Visual Simulation Component makes use of the init( ), run1( ) and run2( ) methods of the cSimCompBase. It is unclear whether the term( ) method is required at this point in time.

The class for this sim component includes the header files for any NuqCodes™ required to communicate with the other simulation components. All inputs and outputs to the component is via NuqCodes. A defined class structure encapsulates the distinct functionality required by the groups identified earlier in this implementation stage.

Figure 11:
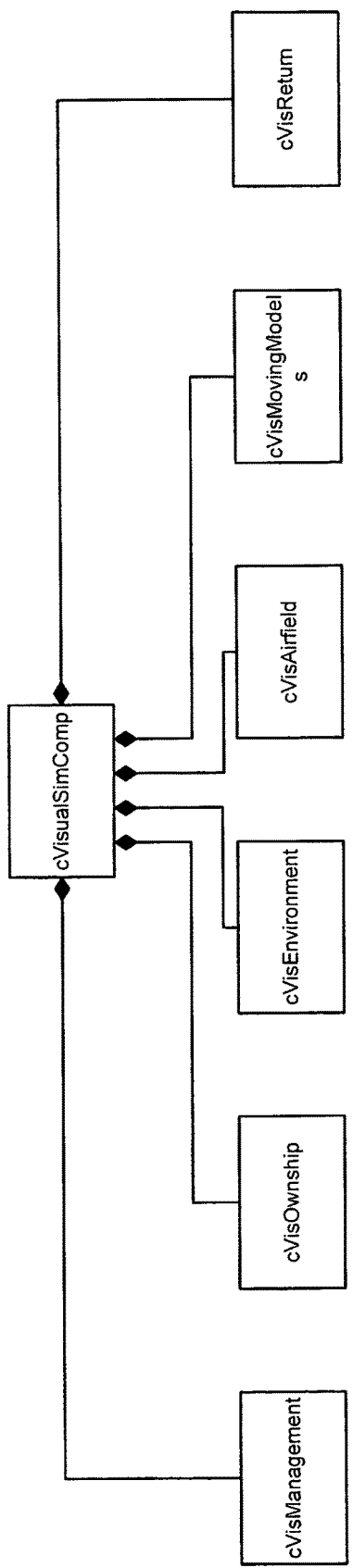

This class structure is as shown in FIG. 11:

The Simulation component has a single INI file controlling all configurable options available in the simulation classes. The following paragraphs define the functionality of this component and its constituent sub classes:

Class: cVisualSimComp
Inherits from: cBaseSimComp
INI File Settings
 IG Type
Eyepoint Offset
HAT Test points (number and position)
Collision detect test points (number and position)
Visual Screen Blanking timer
Members
Local copies of Pointers to NuqCode™ Share Memory Objects
Instances of each class identified in the above class diagram
Eyepoint X,Y,Z offsets
Visual Screen blanking time limit
Structures for cVisualSimComp internal communication between the classes identified above.
Init( ) Functionality
Save local copies of pointers to NuqCode™ Shared Memory objects
Create instances of cVisManagement, cVisOwnship, cVisEnvironment, cVisAirfield, cVisMovingModels & cVisReturn classes
Read Ini file settings and save in local member variables
Run1( ) Functionality
 Functionality of the Run1( ) method of cVisualSimComp is limited to calling the run method of cVisManagement, cVisOwnship, cVisEnvironment, cVisAirfield & cVisMovingModels classes in turn.
Run2( ) Functionality
 Functionality of the Run2( ) method of cVisualSimComp is limited to calling the run method of cVisReturn.
Term( ) Functionality
tbd
Class: cVisManagement
Purpose
 The cVisManagement class handles the overall control of the visual simulation features. This is expected to include features such as:
 Initialisation of visual parameters
 Visual System Display blanking/timeout
 Reposition Screen Blanking
 Monitoring NUQLEUS™—IG communications for missed packets (packet counter)
 Test pattern control
 Viewport & Eyepoint offset control
Members
Visual System Inactivity Timer and associated parameters
Local Copies of Pointers to data passed as Inputs and outputs to this class
Constructor
 Save Input Arguments:
Save local copies of pointers to Input/Output data
Save local copy of Visual Inactivity Timer Limit
Initialise Inactivity timer
Destructor
Set Visual to OFF. (Blank visual etc)

Methods
   Run( ) This method is invoked from the cVisualSimComponent class and provides the top level logic for the Visual Management. This method invokes additional internal (yet to be identified) methods if required.
Inputs
Instructor Visual System On/Off control
Ownship Position
System Freezes (Flight/total)
Outputs
Commanded Visual system On/Off
Selected Test Pattern
Class: cVisOwnship
Purpose
   The cVisOwnship class undertakes to process the ownship visual data from the Host inputs into the format required by the IG Data Formatter. This is expected to cater for features including:
   Eyepoint Position (Lat, long alt & X,Y,Z formats)
   Eyepoint slew control
   Aircraft Lighting commands
   Define HAT return points
   Collision Detect request
Members
Local Copies of pointers to storage locations for data passed as input & Outputs to the Class
Eyepoint Offset from nominal CG position
Number of and position of HAT test points
Number of and position of Collision detect test points
Constructor
   Save Input Arguments:
Pointers to input/Output data locations
Destructor
No functionality identified
Methods
   run( ) This method is invoked from the cVisualSimComponent Class and provides the top level logic for the cVisOwnship functionality. This method sequentially makes calls to the other private methods that comprise this class
   eyepointPosition( ) This method resolves the position of the ownship eyepoint taking consideration of the X,Y,Z pilot's eye position offsets from the nominal CG position. Control is included to provide output in Lat/Long/Altitude and X,Y,Z formats.
   eyepointSlew( ) This method provides control of the eyepoint slew functionality. This is used primarily during the initial commissioning of a visual system to confirm the airfield alignments and reposition points.
   lighting( ) This method provides control of the ownship lighting effects.
   Ownship lighting lobs is requested as defined by the pilot selected Cockpit switches.
   setHat( ) This method when called ensures that terrain height feedback is requested from the IG. This method configures the applicable number and position of test points.
   setCollisionDetect( ) This method when called configures the Ownship collision detection test points.
Inputs
Ownship CG position (lat/long/geometric altitude above ground)
Ownship attitude (pitch/roll/yaw)
Landing Lights—Switch position (strobe, landing lights, navigation lights etc)
Eyepoint slew requested controls
Outputs
Eyepoint position for input to the IG data formatter
Ownship lighting effects
HAT test point positions
Collision detection test points
Class: cVisAirfield
Purpose
   The cVisAirfield class handles the processing of Host and Instructor control panel inputs from the raw NuqCodes™ into the format required by the IG Data Formatter. The features that are handled in this class include:
   Active Airfield
   Generic Airfield Control
   Runway Lighting Control
Members
Local Copies of pointers to storage locations for data passed as input & Outputs to the Class
Active Airfield (Parcel)
Generic Airfield Set up
Constructor
   Save Input Arguments:
Pointers to input/Output data locations
Destructor
No functionality currently identified
Methods
   run( ) This method is invoked from the cVisualSimComponent Class and provides the top level logic for the cVisAirfield functionality. This method sequentially makes calls to the other private methods that comprise this class
   activeParcel( ) This Method when called determines the active visual system parcel
   genericAirfield( ) This method configures the Generic airfield parameters of the IG system based on the features selected by the Instructor. Features available for selection include: Terrain type, runway markings, UK vs US runway markings etc.
   airfieldLighting( ) This method controls the selection of the various airfield lighting effects. Available lighting features include landing aids, runway and taxiway lighting.
Inputs
Instructor commands for generic airfield setup.
Instructor commands for airfield lighting
Ownship Location (used for loading custom models/parcels)
Outputs
Visual airfield and lighting data processed ready for input to the visual data formatter
Class: cVisEnvironment
Purpose
   The cVisEnvironment class handles the interpretation of environmental conditions selected on the instructor control panel and process the input NuqCodes™ into the format required by the IG Data Formatter. The features catered for by this class include:
   Visibility
   Cloud Base/Top
   Storm Control
   Time of day
   Seasons/Snow Scene selection
   Volcanic Ash
   Runway Contamination
   Windsock
Members
   Local Copies of pointers to storage locations for data passed as input & Outputs to the Class
Constructor
   Save local copies of Input arguments:
Pointer to input/output data locations
Methods
   run( ) This method is invoked from the cVisualSimComponent Class and provides the top level logic for the cVisEnvironment functionality. This method sequentially makes calls to the other private methods that comprise this class visibility( ) This method provides control of visibility based on instructor selections. This includes individual selection of Fog, basic RVR, general visibility as well as preconditioned Visibility (CAT I, II, III & CAVOK)

cloudControl( ) This method provides control of the cloud layer top & bottom. At present 2 cloud layers are expected. In addition this method controls the selected of features such as scattered clouds. Cloud layers include the enhanced features including Top/Bottom Fluff and transition layers.

storm( ) This method provides the interpretation of the Storm control (in particular weather RADAR storms), outputs from this method include demands for the positioning of the storm cloud model and rain shaft. To ensure that storm clouds and rain shafts are only requested when they are likely to be visible to the flight crew, a rule is defined to control the activation of each model based on the ownship altitude.

timeOfDay( ) This method handles visual system time of day requests. This includes switching between traditional Time of Day selections and the automatic transitions.

weatherEffects( ) This Method provides control of the selection of seasonal effects available to the instructor. This includes selection of snow, rain, blowing sand, lightning and other weather conditions. Selection of automatic seasonal transitions is enabled.

volcanicAsh( ) This method controls the effects arising from the Volcanic Ash malfunction. The precise effects of this control is determined at a later date.

runwayContamination( ) This method enables selection of various runway contamination effects available for the reference runway. This includes contaminants such as wet and snow covered runways. The actual effect is dependent on the model availability on the IG.

windsockControl( ) This Method extracts the necessary data required to drive a windsock model. The required information is expected to be wind speed and direction as selected by the instructor.

Inputs
Instructor Selected weather Conditions
Caters for Existing IOS and dedicated control panel
Ownship altitude
Outputs
Environmental effects data processed ready for input to the visual data formatter
Class: cVisMovingModels
Purpose
The cVisMovingModels class handles the mapping of moving traffic objects from NuqCode™ data into the format required by the IG Data formatter. Examples of the kind of object catered for in this class include:
  TCAS Traffic/Airborne traffic
  Airfield traffic (eg baggage cart)
  Flocks of Birds
  Marshaller
  Pushback Tug control
  Animation Control (provision)
Members
Local Copies of pointers to storage locations for data passed as input & Outputs to the Class
Constructor
  Save local copies of Input arguments:
Pointer to input/output data locations
Methods
  run( ) This method is invoked from the cVisualSimComponent Class and provides the top level logic for the cVisMovingModels functionality. This method sequentially makes calls to the other private methods that comprise this class processAirTraffic( ) This method processes structures containing data that define the position, status and type of airborne aircraft. These structures contain data that is not applicable to the Visual System; this method extracts the information required by the IG data formatter and places the data in the appropriate NuqCodes.

The NuqCode™ inputs & outputs support multiple traffic structure definitions.

processAirfieldTraffic( ) This method controls the movement of ground based traffic at an airfield. This includes routed traffics. Inputs to the method are likely to originate form instructor selections at the IOS or dedicated control panel.

marshallerControl( ) This method controls the activation and behaviour of the Marshaller. Inputs originate from the IOS and Dedicated control panel. This method optionally invokes either the standard Marshaller animation sequence or a NUQLEUS™ specified and controlled animation sequence (future enhancement).

pushBackControl( ) This method controls the activation demand of a pushback tug. Inputs to this method specifies whether the Push back tug is active or not.

animationControl( ) This method is a placeholder for future enhancements utilising the available animation functionality of the target IG. The availability of custom animation may be IG specific.

Inputs
Structure array defining airborne traffic status and position
Instructor inputs controlling animation sequences, routed traffic and pushback activation
Outputs
Moving Model data processed ready for input to the visual data formatter
Class: cVisReturn
Purpose
  The cVisReturn class handles the interpretation of any returned data from the IG prior to being passed back to the Host. This includes:
  Crash Conditions
  Terrain Height/Height Above terrain
  Terrain Type under ownship
  Route Information feedback
Members
Local Copies of pointers to storage locations for data passed as input & Outputs to the Class
Constructor
  Save local copies of Input arguments:
Pointer to input/output data locations
Destructor
  No Functionality has been identified at present.
Methods
  run( ) This method is invoked from the cVisualSimComponent Class and provides the top level logic for the cVisReturn functionality. This method sequentially makes calls to the other private methods that comprise this class crashDetect( ) This method processes the IG output of crash detection logic and format the data as required by the output NuqCodes. This method applies any necessary latching logic to ensure that transient collisions are not missed by the host software.

terrainHeightReturn( ) This method processes the raw terrain height feedback from the IG and applies any additional processing logic prior (eg smoothing) prior to the output to the Host. Off runway conditions is computed in this method.

informationFeedback( ) This method has been provisioned for handling the processing of additional data that is returned from the IG such as SMCGS and routed traffic descriptions.

Inputs

NuqCodes™ containing decoded but unprocessed IG opcode data.

Outputs

Processed visual system feedback data ready for integrated with the wider simulation software.

Software Flow

Initialisation

Figure 12:
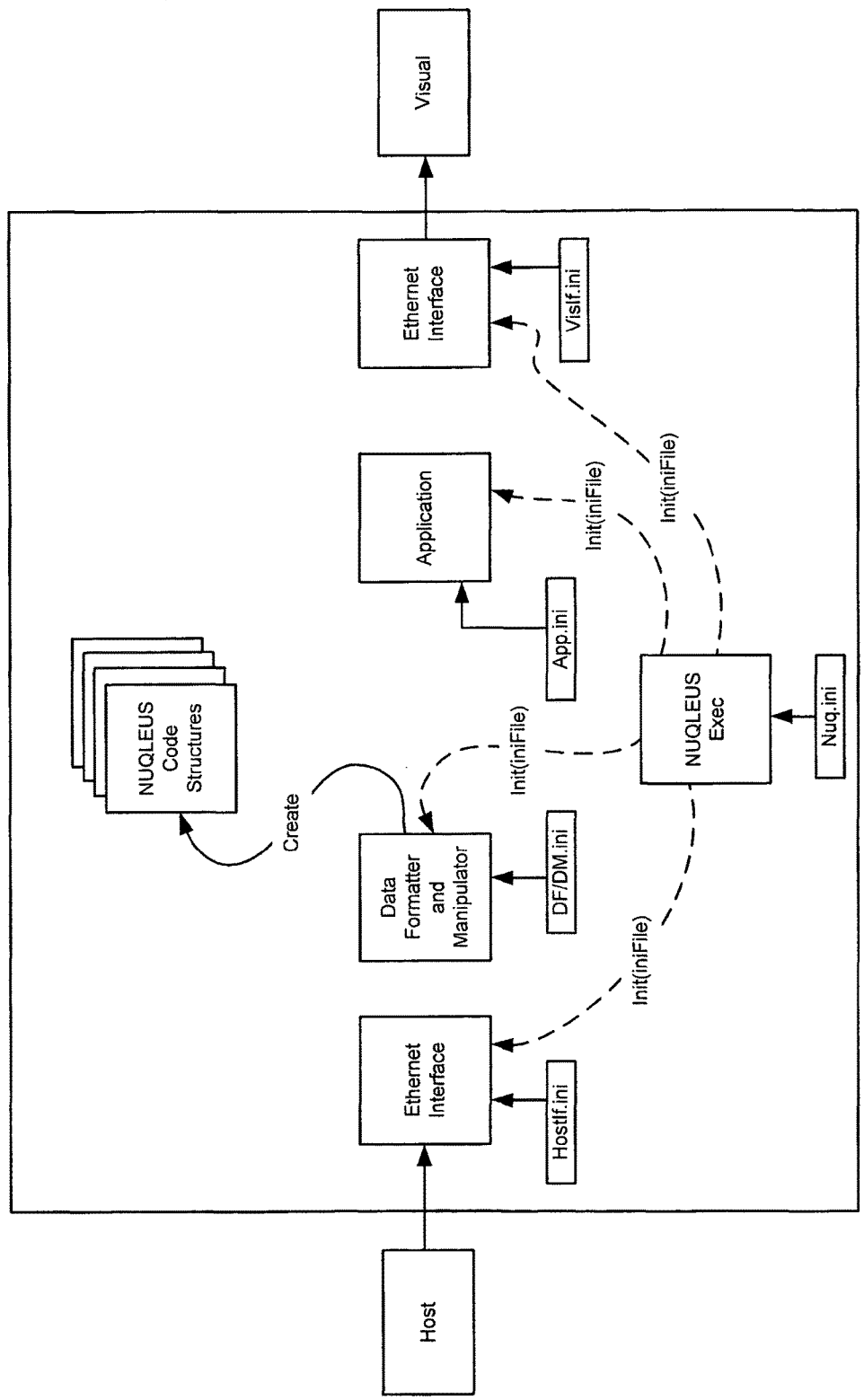

FIG. 12 shows typical Simulation Components during the initialisation of NUQLEUS™:

FIG. 12 shows:

Simulation Components for Host Ethernet Interface, Data Formatter/Manipulator, Application, Visual Ethernet Interface with NUQLEUS™ Executive controlling the system.

At start-up the NUQLEUS™ Executive:

Reads it's initialisation file (NUQ.ini) and holds the information within memory As a result it loads the appropriate Simulation Components (dynamic objects)

It calls init( ) for each Simulation Component, passing the appropriate initialisation file to each (as read from NUQ.ini)

As a result, each Simulation Component is fully initialised and ready to run in response to commands from the NUQLEUS™ executive.

Host to Visual Data Transfer

Figure 13:
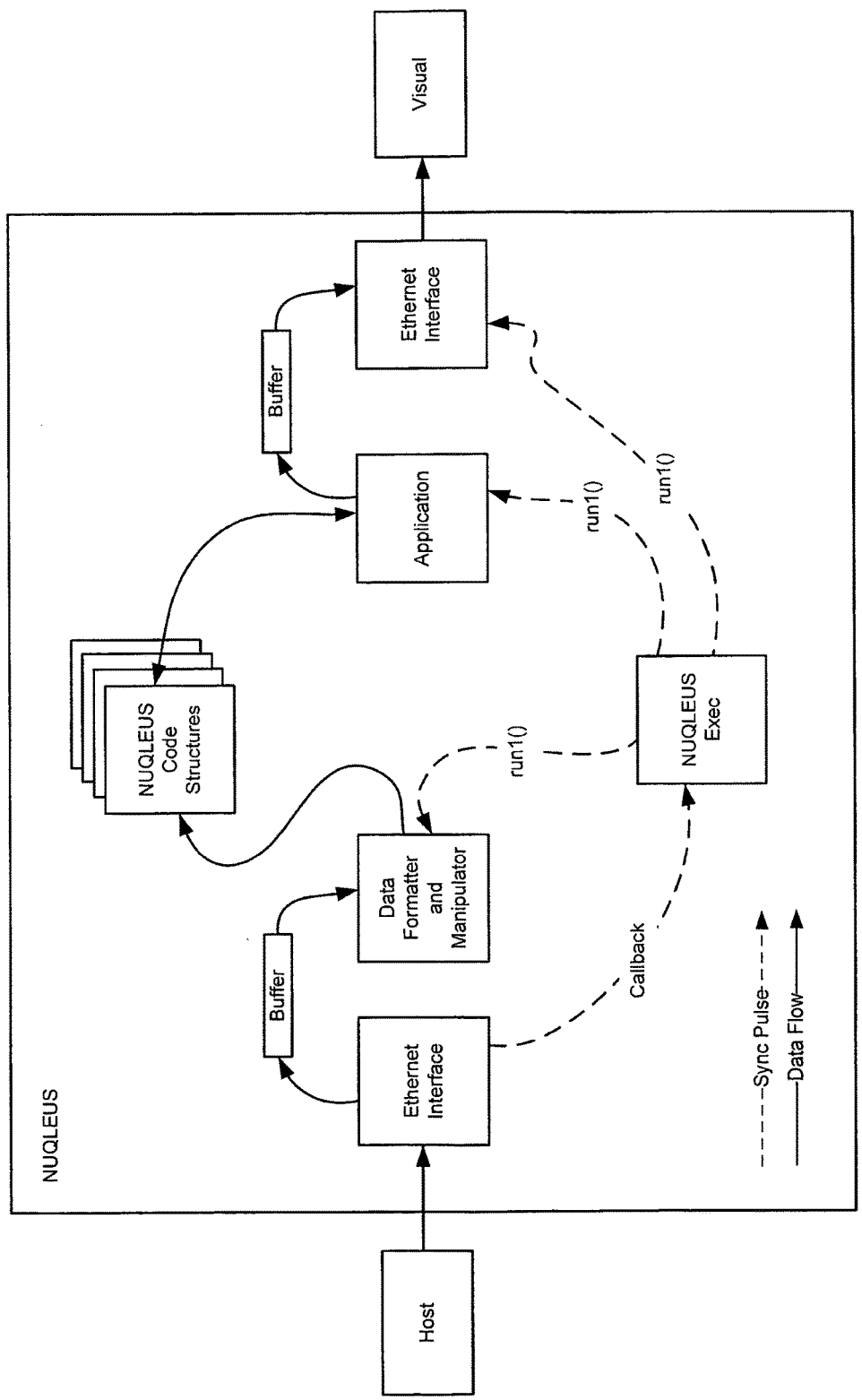

FIG. 13 shows the typical data path for data being received from a Host and being passed onto an external interface (e.g. Visual system).

FIG. 13 shows:

Simulation Components for Host Ethernet Interface, Data Formatter/Manipulator, Application, Visual Ethernet Interface with NUQLEUS™ Executive controlling the system.

Data from the host is retrieved via the Ethernet Interface Simulation Component. This loads data into a buffer and informs the NUQLEUS™ Executive that data is available (via a callback).

The NUQLEUS™ Executive then calls each of the Simulation Components in turn: Data Formatter/Manipulator, Application, Visual Ethernet Interface.

The Data Formatter/Manipulator takes the data within the host buffer and creates the NUQLEUS™ Code structures within Shared Memory The information within these structures is used by the application(s). Where required, data can be written back to (other) NUQLEUS™ Code structures.

The Visual Ethernet interface sends the data out to the Visual

Visual to Host Data Transfer

Figure 14:
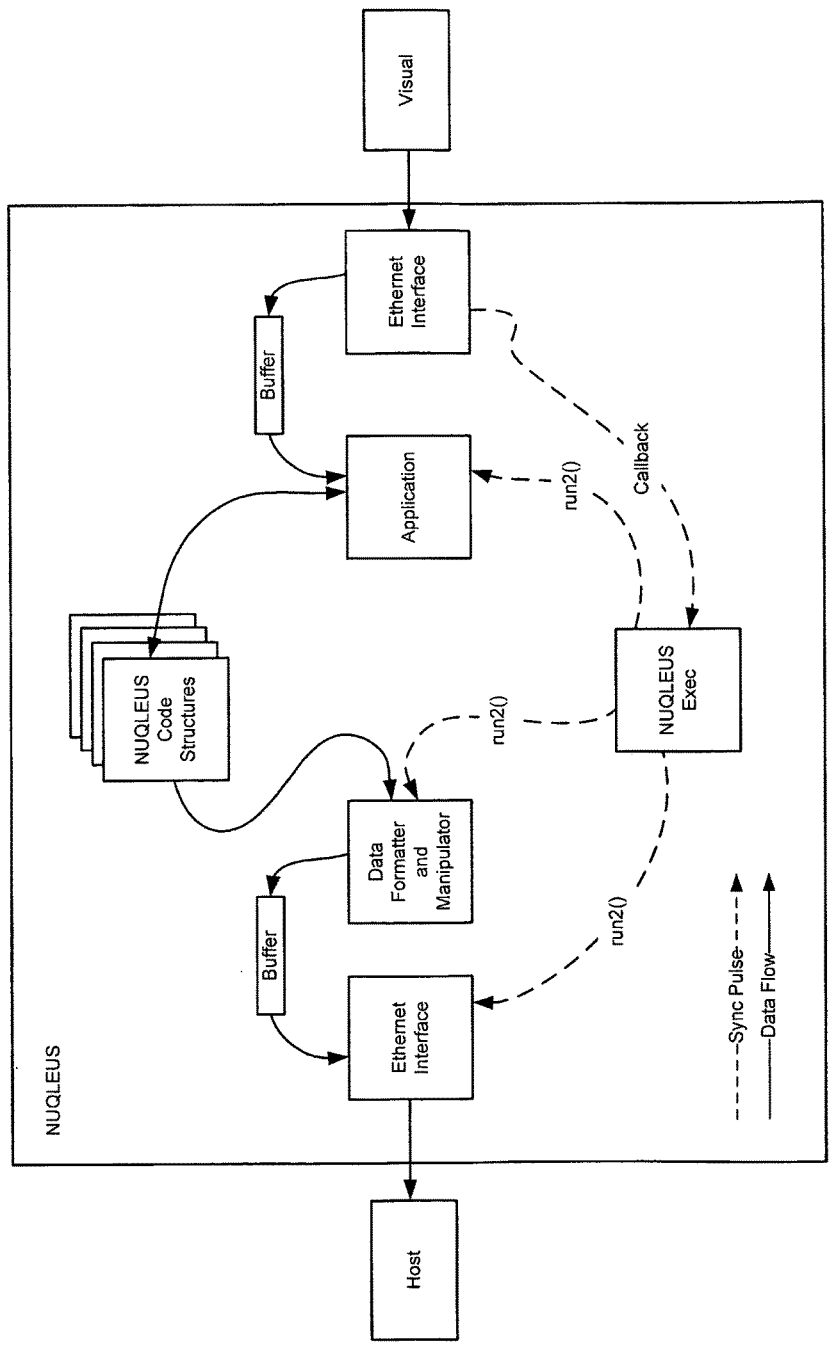

FIG. 14 shows the typical data path for data being received from External Interface (Visual) and being passed back to host:

FIG. 14 shows:

Simulation Components for Host Ethernet Interface, Data Formatter/Manipulator, Application, Visual Ethernet Interface with NUQLEUS™ Executive controlling the system.

Data from the Visual is retrieved via the Ethernet Interface Simulation Component. This loads data into a buffer and informs the NUQLEUS™ Executive that data is available (via a callback).

The NUQLEUS™ Executive then calls each of the Simulation Components in turn: Application, Data Formatter/Manipulator, Host Ethernet Interface.

The application Simulation Component formats the data as required into the NUQLEUS™ Code structures The Data Formatter/Manipulator takes this data and packages it up into buffer for transmission to host.

The Host Ethernet interface sends the data out to the Host

Although the above exemplary embodiments have been described with reference to the integration of a new VIG system 204 with an existing computing architecture for a flight simulator, it will be appreciated that the update apparatus 206 according to the invention can be utilised to integrate any new subsystem, for example, a new avionics or sound and aural cueing subsystem.

The update apparatus 206 may also be operable to integrate more than one new subsystem to an existing computing architecture. For example, the update apparatus could be utilised to integrate both a new VIG system and a new avionics system. In such embodiments, the executive component 310 of the update apparatus 206 may be configured, under the control of the executive initialisation file 400, to cause two different sets of simulation components to be loaded. Thus the executive component may cause two different target interface modules, one for each new subsystem, two different host interface modules, each one being for receiving data relating to a different one of the new subsystems, and two different sets of simulation components, each for operating on data relating to a different one of the new subsystems. The executive initialisation file 400 may specify a plurality of triggers, one in respect of each of the different data paths through the update apparatus 206. For example, an update apparatus for integrating two new subsystems may have four different data paths (i.e. to and from each of the new subsystems) and thus the executive initialisation file 400 specifies four different triggers.

It will be understood that the invention is also relevant to other types of vehicle simulator such as tank and truck simulators. Furthermore, the invention may be utilised to integrate new subsystems with many types of computing and hardware architecture. The invention is advantageous for updating any system which comprises both software and expensive hardware having a relatively long lifespan. For example, the invention may also be utilised to upgrade medical imaging systems such as magnetic resonance imaging systems, computed axial tomography systems and electro- and magneto-encephalography systems. Similarly, the invention may be used to upgrade other types of large machinery such as factory machinery or amusement park or fairground machinery.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. Apparatus, comprising:

an update apparatus integrating a new subsystem with a simulator system comprising a host computer system;

a first physical interface for receiving data from the host computer system at the update apparatus;

a second physical interface for outputting data from the update apparatus to the new subsystem;

one or more processors on the update apparatus configured to execute software modules; and the update apparatus having memory on which is stored a first software module, a plurality of other software modules, and a first stored configuration, the other software modules including at least a physical host interface component, one or more simulation components for providing simulation control for one or more subsystems being added to the host computer system, a component configured to perform at least one of formatting and manipulating data and a target interface component, the first software module being configured to control loading and execution of the plurality of other software modules, the memory and the first software module, the plurality of other software modules, and the first stored configuration being configured, with the one or more processors, to cause the apparatus to perform at least the following:

reading, by the first software module, the first stored configuration, the first stored configuration comprising trigger information, the trigger information identifying a combination of ones of the plurality of other software modules, a first subset of the combination of ones of the plurality of other software modules, the first subset including at least the physical host interface component, at least one of the simulation components, the component configured to perform at least one of formatting and manipulating data and the target interface component, a function to be specified by a first command signal, and a sequence of the software modules in the first subset;

loading by the first software module the combination of ones of the plurality of other software modules; and transforming, by the first subset of the combination, the data received at the first physical interface into a form that is compatible with the new subsystem and providing the transformed data to the new subsystem via the second physical interface, said transforming comprising:

responding, by the physical host interface component, to the arrival of data at the first physical interface by sending a signal indicative of the arrival of the data at the first physical interface to the first software module, storing in a buffer, by the physical host interface component, the arrived data, in response to the receipt of the signal indicative of the arrival of the data at the first physical interface, sending, by the first software module, the first command signal specifying the function defined in the trigger information successively to each of the other ones of the first subset of the combination of other software modules including the at least one of the simulation components, the component configured to perform at least one of formatting and manipulating data and the target interface component in accordance with the sequence defined by the trigger information, said sending successively comprising at least:

sending, from the first software module, the first command signal specifying the function defined in the trigger information to the component configured to perform at least one of formatting and manipulating data thereby executing the function specified in the first command signal at the component configured to perform at least one of formatting and manipulating data, the component configured to perform at least one of formatting and manipulating data responding by reading the arrived data stored in the buffer, at least one of formatting and manipulating the data, and placing the data that has been at least one of formatted and manipulated in a first data structure in a shared memory, sending, from the first software module, the first command signal specifying the function defined in the trigger information to the first simulation component thereby executing the function specified in the first command signal at a first simulation component, the first simulation component responding by reading the data from the first data structure or by reading data from another data structure that is derived from the data in the first data structure, operating on the data read from the first data structure or in the other data structure, and placing the operated on data in at least a second data structure in the shared memory, sending, from the first software module, the first command signal specifying the function defined in the trigger information to the target interface component thereby executing the function specified in the first command signal at a target interface component, the target interface component responding by reading data from the second data structure or by reading data from a third data structure that is derived from the data in the second data structure and outputting, from the target interface component and via the second physical interface, the data read from the second data structure or from the third data structure to the new subsystem, wherein the memory and the first software module, the plurality of other software modules, and the first stored configuration are further configured, with the one or more processors, to cause the apparatus to perform at least the following:

sending data from the new subsystem back to the target interface component and placing the data in the shared memory, sending, from the first software module, a second command signal to a second subset of the combination of ones of the plurality of other software modules thereby at least executing a function specified by the second command signal at the first simulation component or at a second simulation component, the first simulation component or the second simulation component responding by reading data from a fourth data structure in the shared memory, the data in fourth data structure being derived from the data sent from the new subsystem, operating on the read data from the fourth data structure, and placing the operated on data in a fifth data structure in the shared memory, and executing the function specified by the second command signal at the physical host interface component, the physical host interface component responding by reading data from the fifth data structure or from a sixth data structure that is derived from the data in the fifth data structure and sending the read data to the host computer system.

2. The apparatus of claim 1, wherein the second physical interface is configured to receive data from the new subsystem, the memory and the first software module, the plurality of other software modules, and the first stored configuration being further configured, with the one or more processors, to cause the apparatus to perform at least the following:

identifying, based on the first stored configuration, a second subset of the combination of ones of the plurality of other software modules;

causing, by the first software module, execution of the second subset of the combination of ones of the plurality of other software modules;

transforming, by the second subset of the combination of ones of the plurality of other software modules, data received at the second physical interface into a form that is compatible with the host computer system and providing the transformed data to the host computer system via the first physical interface.

3. The apparatus of claim 2, the memory and the first software module, the plurality of other software modules, and the first stored configuration being further configured, with the one or more processors, to cause the apparatus to perform at least the following:

responding, by a first one of the second subset of the combination of other software modules, to the arrival of data at the second physical interface by sending a signal indicative of the arrival of the data at the second physical interface to the first software module, responding, by the first software module, to the receipt of the signal indicative of the arrival of the data at the second physical interface by sending second command signals successively to each of the other ones of the second subset of the combination of other software modules, responding, by the other ones of the second subset of the combination of other software modules, to the receipt of the second command signal by operating on data output from a previous one of the second subset of the combination of other software modules.

4. The apparatus of claim 1, wherein the predefined data structures are stored in shared memory, the shared memory being shared between all of the plurality of other software modules.

5. The apparatus of claim 1, the memory and the first software module, the plurality of other software modules, and the first stored configuration being further configured, with the one or more processors, to cause the apparatus to perform at least the following:

identifying, by the first software module based on the first stored configuration, at least one other stored configuration; and causing, by the first software module, one or more of the loaded other software modules to read a respective one of the at least one other stored configuration.

6. The apparatus of claim 1, the memory and the first software module, the plurality of other software modules, and the first stored configuration being further configured, with the one or more processors, to cause the apparatus to perform at least the following:

identifying, by the first software module based on the first stored configuration, a plurality of other stored configurations; and causing, by the first software module, each of the loaded other software modules to read a respective one of the plurality of other stored configurations.

7. The apparatus of claim 5, wherein the each of the other stored configurations defines settings for a respective one of the loaded other software modules.

8. The apparatus of claim 5, wherein each of the other stored configurations comprises an initialisation file.

9. The apparatus of claim 1, wherein the first stored configuration comprises an initialisation file.

10. A method performed by apparatus, the apparatus comprising an update apparatus integrating a new subsystem with a simulator system comprising a host computer system, a first physical interface for receiving data from the host computer system at the update apparatus, a second physical interface for outputting data from the update apparatus to the new subsystem, one or more processors on the update apparatus configured to execute software modules, the update apparatus having memory on which is stored a first software module, a plurality of other software modules, and a first stored configuration, the other software modules including at least a physical host interface component, one or more simulation components for providing simulation control for one or more subsystems being added to the host computer system, a component configured to perform at least one of formatting and manipulating data and a target interface component, the first software module being configured to control loading and execution of the plurality of other software modules, the method comprising the update apparatus performing the following steps:

reading the first stored configuration, the first configuration comprising trigger information, the trigger information identifying a combination of ones of the plurality of other software modules, a first subset of the combination of ones of the plurality of other software modules, the first subset including at least the physical host interface component, at least one of the simulation components, the component configured to perform at least one of formatting and manipulating data and the target interface component, a function to be specified by a first command signal, and a sequence of the software modules in the first subset;

loading by the first software module the combination of ones of the plurality of software modules; and transforming, by the first subset of the combination, the data received at the first physical interface into a form that is compatible with the new subsystem and providing the transformed data to the new subsystem via the second physical interface, said transforming comprising:

responding, by the physical host interface component, to the arrival of data at the first physical interface by sending a signal indicative of the arrival of the data at the first physical interface to the first software module, storing in a buffer, by the physical host interface component, the arrived data, in response to the receipt of the signal indicative of the arrival of the data at the first physical interface, sending, by the first software module, the first command signal specifying the function defined in the trigger information successively to each of the other ones of the first subset of the combination of other software modules including the at least one of the simulation components, the component configured to perform at least one of formatting and manipulating data and the target interface component in accordance with the sequence defined by the trigger information, said sending successively comprising at least:

sending, from the first software module, the first command signal specifying the function defined in the trigger information to the component configured to perform at least one of formatting and manipulating data thereby executing the function specified in the first command signal at the component configured to perform at least one of formatting and manipulating data, the component configured to perform at least one of formatting and manipulating data responding by reading the arrived data stored in the buffer, at least one of formatting and manipulating the data, and placing the data that has been at least one of formatted and manipulated in a first data structure in a shared memory, sending, from the first software module, the first command signal specifying the function defined in the trigger information to the first simulation component thereby executing the function specified in the first command signal at a first simulation component, the first simulation component responding by reading the data from the first data structure or by reading data from another data structure that is derived from the data in the first data structure, operating on the data read from the first data structure or in the other data structure, and placing the operated on data in at least a second data structure in the shared memory, sending, from the first software module, the first command signal specifying the function defined in the trigger information to the target interface component thereby executing the function specified in the first command signal at a target interface component, the target interface component responding by reading data from the second data structure or by reading data from a third data structure that is derived from the data in the second data structure and outputting, from the target interface component and via the second physical interface, the data read from the second data structure or from the third data structure to the new subsystem, wherein the method comprises the update apparatus further performing the following steps:

sending data from the new subsystem back to the target interface component and placing the data in the shared memory, sending, from the first software module, a second command signal to a second subset of the combination of ones of the plurality of other software modules thereby at least executing a function specified by the second command signal at the first simulation component or at a second simulation component, the first simulation component or the second simulation component responding by reading data from a fourth data structure in the shared memory, the data in fourth data structure being derived from the data sent from the new subsystem, operating on the read data from the fourth data structure, and placing the operated on data in a fifth data structure in the shared memory, and executing the function specified by the second command signal at the physical host interface component, the physical host interface component responding by reading data from the fifth data structure or from a sixth data structure that is derived from the data in the fifth data structure and sending the read data to the host computer system.

11. The method of claim 10, comprising:
identifying, based on the first stored configuration, a second subset of the combination of ones of the plurality of other software modules;
receiving data from the new subsystem at the second physical interface;
the second subset of the combination of ones of the plurality of other software modules transforming data received at the second physical interface into a form that is compatible with the host computer system; and
outputting the transformed data to the host computer system via the first physical interface.

12. The method of claim 10, comprising:
identifying, based on the first stored configuration, at least one other stored configuration; and
the first software module causing one or more of the loaded other software modules to read a respective one of the at least one other stored configuration.

13. A non-transitory computer-readable memory medium comprising computer-readable instructions for integrating a new subsystem with a simulator system comprising a host computer system, the computer-readable instructions comprising a first software module, a plurality of other software modules, and a first stored configuration, the other software modules including at least a physical host interface component, one or more simulation components for providing simulation control for one or more subsystems being added to the host computer system, a component configured to perform at least one of formatting and manipulating data and a target interface component, the first software module being configured to control loading and execution of the plurality of other software modules, the memory medium and the first software module, the plurality of other software modules, and the first stored configuration being configured, with computing apparatus, to cause the computing apparatus to perform at least the following:

reading, by the first software module, the first stored configuration, the first stored configuration comprising trigger information, the trigger information identifying a combination of ones of the plurality of other software modules, a first subset of the combination of ones of the plurality of other software modules, the first subset including at least the physical host interface component, at least one of the simulation components, the component configured to perform at least one of formatting and manipulating data and the target interface component, a function to be specified by a first command signal, and a sequence of the software modules in the first subset;

loading by the first software module the combination of ones of the plurality of software modules; and transforming, by the first subset of the combination of ones of the plurality of other software modules, data received at a first physical interface into a form that is compatible with the new subsystem and providing the transformed data to the new subsystem via a second physical interface, said transforming comprising:

responding, by the physical host interface component, to the arrival of data at the first physical interface by sending a signal indicative of the arrival of the data at the first physical interface to the first software module, storing in a buffer, by the physical host interface component, the arrived data, in response to the receipt of the signal indicative of the arrival of the data at the first physical interface, sending, by the first software module, the first command signal specifying the function defined in the trigger information successively to each of the other ones of the first subset of the combination of other software modules including the at least one of the simulation components, the component configured to perform at least one of formatting and manipulating data and the target interface component in accordance with the sequence defined by the trigger information, said sending successively comprising at least:

sending, from the first software module, the first command signal specifying the function defined in the trigger information to the component configured to perform at least one of formatting and manipulating data thereby executing the function specified in the first command signal at the component configured to perform at least one of formatting and manipulating data, the component configured to perform at least one of formatting and manipulating data responding by reading the arrived data stored in the buffer, at least one of formatting and manipulating the data, and placing the data that has been at least one of formatted and manipulated in a first data structure in a shared memory, sending, from the first software module, the first command signal specifying the function defined in the trigger information to the at least one simulation component thereby executing the function specified in the first command signal at a first simulation component, the first simulation component responding by reading the data from the first data structure or by reading data from another data structure that is derived from the data in the first data structure, operating on the data read from the first data structure or in the other data structure, and placing the operated on data in at least a second data structure in the shared memory, sending, from the first software module, the first command signal specifying the function defined in the trigger information to the target interface component thereby executing the function specified in the first command signal at a target interface component, the target interface component responding by reading data from the second data structure or by reading data from a third data structure that is derived from the data in the second data structure and outputting, from the target interface component and via the second physical interface, the data read from the second data structure or from the third data structure to the new subsystem, wherein the method comprises the update apparatus further performing the following steps:

sending data from the new subsystem back to the target interface component and placing the data in the shared memory, sending, from the first software module, a second command signal to a second subset of the combination of ones of the plurality of other software modules thereby at least executing a function specified by the second command signal at the first simulation component or at a second simulation component, the first simulation component or the second simulation component responding by reading data from a fourth data structure in the shared memory, the data in fourth data structure being derived from the data sent from the new subsystem, operating on the read data from the fourth data structure, and placing the operated on data in a fifth data structure in the shared memory, and executing the function specified by the second command signal at the physical host interface component, the physical host interface component responding by reading data from the fifth data structure or from a sixth data structure that is derived from the data in the fifth data structure and sending the read data to the host computer system.

14. The non-transitory computer-readable memory medium of claim 13, the memory medium and the first software module, the plurality of other software modules, and the first stored configuration being further configured, with computing apparatus, to cause the computing apparatus to perform at least the following:

identifying, based on first stored configuration, a second subset of the combination of ones of the plurality of other software modules; and transforming, by the second subset of the combination of ones of the plurality of other software modules, data received at the second physical interface into a form that is compatible with the host computer system and outputting the transformed data to the host computer system via the first physical interface.

15. The non-transitory computer-readable memory medium of claim 13, the memory medium and the first software module, the plurality of other software modules, and the first stored configuration being further configured, with computing apparatus, to cause the computing apparatus to perform at least the following:

identifying, based on the first stored configuration, at least one other stored configuration; and reading, by each of one or more of the loaded other software modules, a respective one of the at least one other stored configuration.

* * * * *